(12) United States Patent
Ford et al.

(10) Patent No.: US 10,185,134 B2
(45) Date of Patent: Jan. 22, 2019

(54) TOTAL INTERNAL REFLECTION APERTURE STOP IMAGING

(71) Applicant: The Regents of the University of California, Oakland, CA (US)

(72) Inventors: Joseph Ford, Solana Beach, CA (US); Ilya Agurok, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/382,551

(22) Filed: Dec. 16, 2016

(65) Prior Publication Data

US 2017/0176730 A1  Jun. 22, 2017

Related U.S. Application Data

(60) Provisional application No. 62/271,187, filed on Dec. 22, 2015, provisional application No. 62/269,865, filed on Dec. 18, 2015.

(51) Int. Cl.
| | | |
|---|---|---|
| *G02B 9/08* | (2006.01) | |
| *G02B 17/08* | (2006.01) | |
| *G02B 3/00* | (2006.01) | |
| *G02B 5/00* | (2006.01) | |
| *G02B 6/06* | (2006.01) | |

(52) U.S. Cl.
CPC ......... *G02B 17/086* (2013.01); *G02B 3/0087* (2013.01); *G02B 5/005* (2013.01); *G02B 6/06* (2013.01)

(58) Field of Classification Search
CPC ........ G02B 3/00; G02B 3/0087; G02B 5/005; G02B 6/06; G02B 17/086

USPC .................................. 359/738–741
See application file for complete search history.

(56) References Cited

U.S. PATENT DOCUMENTS

| | | |
|---|---|---|
| 3,305,294 A | 2/1967 | Alvarez |
| 6,940,645 B2 | 9/2005 | Liang et al. |
| 2008/0123049 A1 | 5/2008 | Volk |
| 2013/0076900 A1 | 3/2013 | Mrozek et al. |
| 2013/0114147 A1 | 5/2013 | Stark |
| 2015/0207990 A1 | 7/2015 | Ford et al. |

OTHER PUBLICATIONS

Andanta, "Curved High Resolution CCD Sensors—Overview," Preliminary Short Form Datasheet V0.1 dtd., Apr. 18, 2013.
Brady, David J., and Nathan Hagen. "Multiscale lens design." Optics express 17.13 (2009): 10659-10674.
D. Shafer, "Lens designs with extreme image quality features," *Advanced Optical Technologies*, 2(1), 53-62, 2013.
(Continued)

*Primary Examiner* — William Choi
(74) *Attorney, Agent, or Firm* — Mintz Levin Cohn Ferris Glovsky and Popeo, P.C.

(57) ABSTRACT

In some example embodiments, there is provided an apparatus comprising a lens comprising a first medium having a first index of refraction and a second medium having a second index of refraction, wherein the first index of refraction is greater than the second index of refraction; wherein an interface between the first medium and the second medium is convex, and wherein total internal reflection from the first medium to the second medium forms an aperture on light transmission with edges dependent on the angle of light incidence. Related system, methods, and the like are also disclosed.

7 Claims, 31 Drawing Sheets
(30 of 31 Drawing Sheet(s) Filed in Color)

(56) References Cited

OTHER PUBLICATIONS

M. Born, E. Wolf, "Principals of Optics," Permagon Press, 1968.
Marks, Daniel L., and David J. Brady. "Gigagon: a monocentric lens design imaging 40 gigapixels." Imaging Systems. Optical Society of America, 2010.
Marks, Daniel L., et al. "Microcamera aperture scale in monocentric gigapixel cameras." Applied optics 50.30 (2011): 5824-5833.
Milojkovic, Predrag, and Joseph N. Mait. "Space-bandwidth scaling for wide field-of-view imaging." Applied optics 51.4 (2012): A36-A47.
Shafer, David. "Galaxy wars optics." Optics News 14.6 (1988): 9-13.
Shafer, David. "Some odd and interesting monocentric designs." Optics & Photonics 2005. International Society for Optics and Photonics, 2005.
Son, Hui, et al. "A multiscale, wide field, gigapixel camera." Computational Optical Sensing and Imaging. Optical Society of America, 2011.
Stamenov, Igor, et al. "Panoramic monocentric imaging using fiber-coupled focal planes." Optics express 22.26 (2014): 31708-31721.
Stamenov, Igor, Ilya Agurok, and Joseph E. Ford. "Optimization of high-performance monocentric lenses." Applied optics 52.34 (2013): 8287-8304.
Stamenov, Igor, Ilya P. Agurok, and Joseph E. Ford. "Optimization of two-glass monocentric lenses for compact panoramic imagers: general aberration analysis and specific designs." Applied optics 51.31 (2012): 7648-7661.
Zemax Optical Design Program User's Manual. Jul. 8, 2011. Manual.

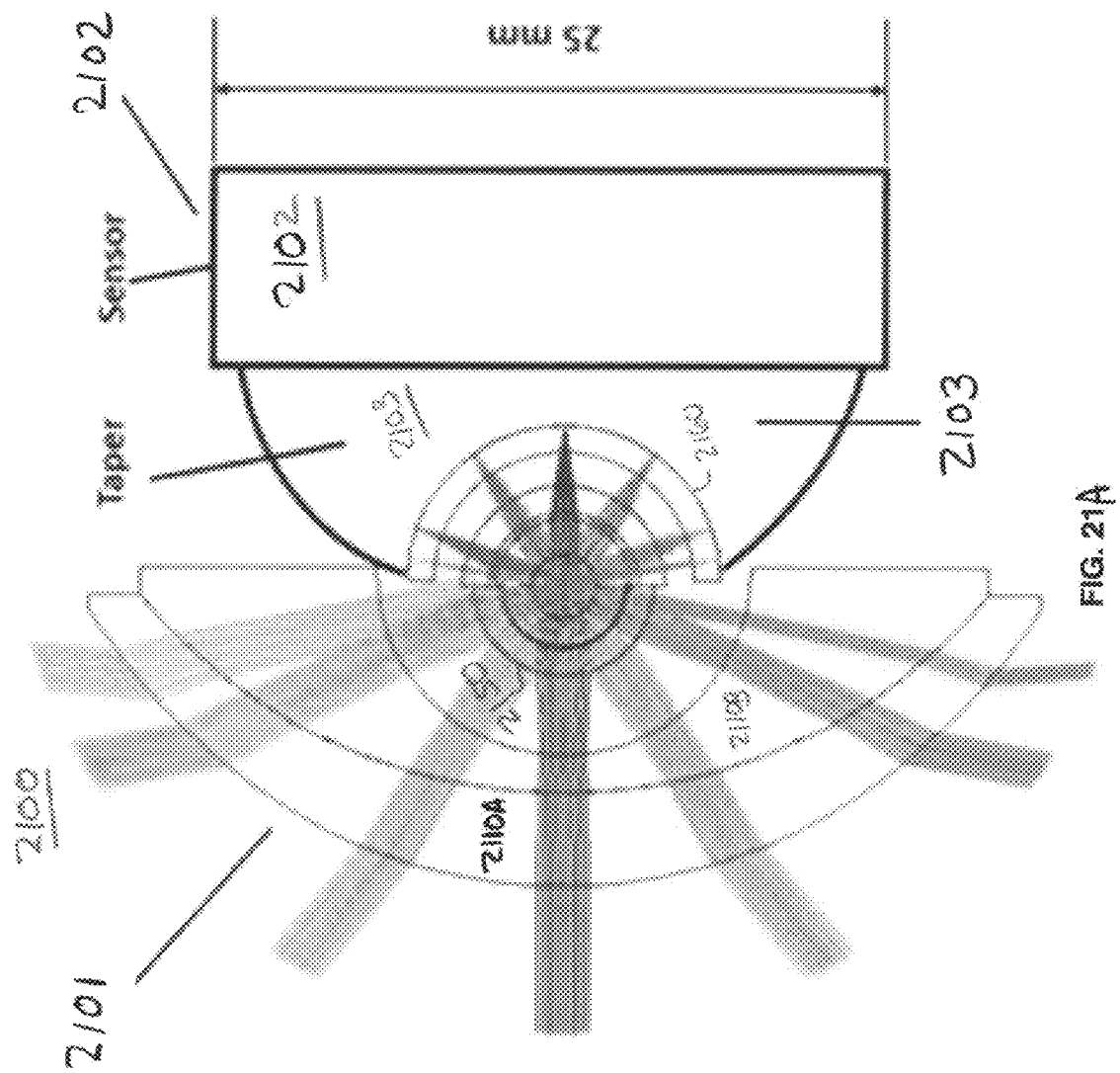

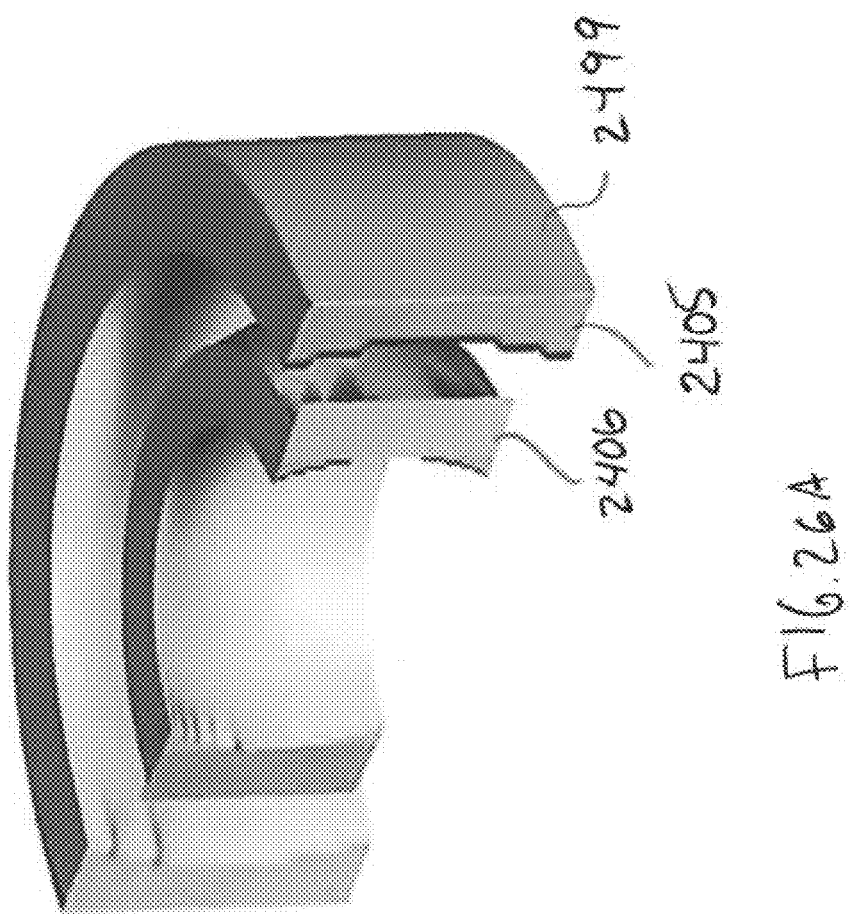

TOTAL INTERNAL REFLECTION APERTURE STOP IMAGING

CROSS-REFERENCE TO RELATED APPLICATIONS

This application claims priority to U.S. Provisional Patent Application Nos. 62/269,865 filed Dec. 18, 2015, entitled "MONOCENTRIC FIELD FLATTENED IMAGING," and 62/271,187 filed Dec. 22, 2015, entitled "TOTAL INTERNAL REFLECTION APERTURE STOP IMAGING," the contents of which are hereby incorporated by reference in their entireties.

TECHNICAL FIELD

The subject matter disclosed herein may be related to wide-angle optical systems including imaging systems including monocentric lenses.

BACKGROUND

The image formed by a lens would ideally be uniform in brightness over the entire field of view. In practice, most lenses suffer some amount of darkening at the image edges, corresponding to larger input scene field angles $\theta$. This non-uniform field illumination of the image formed depends on the lens structure, but most multi-element or compound lenses can suffer from some degree of such image non-uniformity. An ideal thin lens has an intensity drop-off that depending on field angle as $\cos^4(\theta)$. The source of this drop-off may be a product of extrinsic $\cos(\theta)$ factors indicating the orientation and distance of the object from the lens, and the orientation of the image sensor surface relative to the lens, and the light energy collected by the lens aperture or entrance pupil. One of the contributions to this reduction in brightness comes from the tilt of the lens entrance aperture relative to the object. For example, a circular thin single lens aperture tilted at 60° collects half as much of the total light energy it collects at 0°. For multiple element lenses, the area of light collection is limited by a physical aperture stop inside the lens. This may typically be caused by a variable diameter iris within the lens, or by the edges of one of the lens elements. The apparent input aperture as seen from the object side of the lens, called the entrance pupil, is the projection of the physical aperture stop within the lens.

SUMMARY

In some example embodiments, there is provided an apparatus comprising a lens comprising a first medium having a first index of refraction and a second medium having a second index of refraction, wherein the first index of refraction is greater than the second index of refraction; wherein an interface between the first medium and the second medium is convex, and wherein total internal reflection from the first medium to the second medium forms an aperture on light transmission with edges dependent on the angle of light incidence.

In some variations, one or more of the features disclosed herein including the following features can optionally be included in any feasible combination. The convex interface between the first medium and the second medium is spherical. A plurality of surfaces within the lens are spherical and share a common center of curvature. The second medium having a second index of refraction is followed by a third medium having a third index of refraction that is greater than the second index of refraction. A thickness of the second medium is less than the focal length of the apparatus.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

BRIEF DESCRIPTION OF THE DRAWINGS

The patent or application file contains at least one drawing executed in color. Copies of this patent or patent application with color drawing(s) will be provided by the Office upon request and payment of the necessary fee.

The accompanying drawings, which are incorporated in and constitute a part of this specification, show certain aspects of the subject matter disclosed herein and, together with the description, help explain some of the principles associated with the disclosed implementations. In the drawings.

FIG. 21A shows the lens of FIG. 17 including a fiber taper coupling the lens to a planar image sensor;

FIG. 26A depicts toroidal field flatteners and an image sensor;

DETAILED DESCRIPTION

Figure 1:
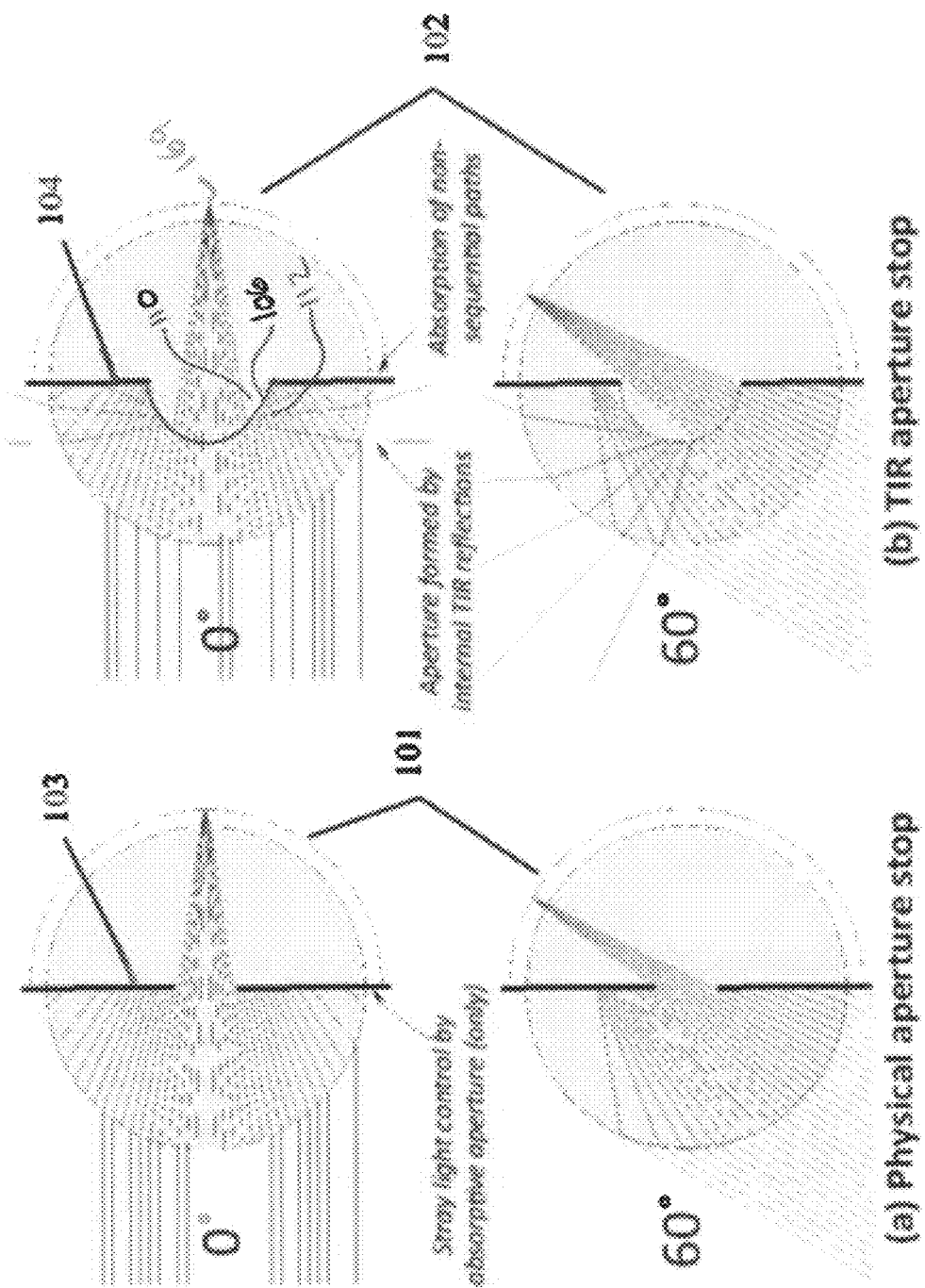
FIG. 1 depicts a monocentric singlet lens including a physical aperture stop, as well as a monocentric lens with the virtual stop this is the subject of the current invention.

In some example embodiments, a so-called "virtual" aperture (also referred to herein as virtual aperture stop) may be provided. This virtual aperture may be formed using a thin, low refraction index layer configured to provide total internal reflection (TIR), which provides filtering. This virtual aperture can be used in a wide variety of optical systems in which a relatively angle-independent aperture and/or compact, physical form may be desired.

In some example embodiments, the virtual aperture stop including the TIR layer may be comprised in an apparatus including monocentric lenses. When monocentric lenses are used, the TIR layer can enable wide-angle imaging.

The monocentric (MC) lens refers to a type of lens composed of concentric hemispherical optical surfaces, each of which may comprise a lens, which may be in the shape of a meniscus or spherical ball. The monocentric lens may be implemented as a compound lens having a common center of curvature for all its components. Many lenses are relatively flat, with a center thickness that is much smaller than the radius of curvature of the front and back surfaces, and the center of curvature of the front and back surfaces are at different locations. A monocentric lens is made only of spherical or hemispherical refractive or reflective surfaces, with all surfaces having a radius of curvature centered on a single point. Most lenses are designed to form an image on a flat focal plane. Instead, a monocentric lens forms an image on a concentric spherical surface at a radius equal to the focal length of the lens. This monocentric lens structure has an advantage of eliminating many optical aberrations, especially those which become problematic at large field angles. A simple example of a monocentric lens is a spherical ball of glass, where the front and back optical surfaces are both spherical and have the same radius and center of curvature. More complex monocentric lenses may have multiple hemispherical lens surfaces, and contain multiple materials (such as optical glasses, plastics, or internal air cavities), with a structure that is typically chosen to reduce lens aberrations such as axial chromatic aberration. The monocentric lens can focus an object plane at an arbitrary distance onto an imaging surface, such as a spherical image surface. The monocentric lens geometry may, as noted, enable compact, wide-angle lenses with well-corrected aberrations including spherochromatism. In monocentric lens-based systems, the chief ray is normal to the image surface. The image surface may, as noted, be curved to maintain a constant distance between the pupil and the image, which may eliminate some of the internal $\cos(\theta)$ factors. However, if the monocentric lens implements, at the center of symmetry, a traditional, physical aperture stop, rather than the virtual aperture stop disclosed herein, the monocentric lens will still suffer some remaining internal $\cos(\theta)$ apodization.

The monocentric lens geometry (which includes the virtual aperture stop implemented as a TIR filtering layer) may control, or filter, stray light. The TIR filtering layer formed by a convex lens surface between high index of refraction and low index of refraction material. Unlike a conventional light absorptive aperture, the TIR virtual stop aperture is aligned concentric with the field illumination angle, which may eliminate some of the remaining $\cos(\theta)$ apodization factor.

In some example embodiments, there may be provided different architectures of monocentric lenses operating with a TIR layer providing a virtual aperture stop.

In some example embodiments, the monocentric lens includes a TIR layer (which may comprise a low refraction index material) followed by another, higher refraction index material. The resulting aberration of light in the regions near the transmission/reflection transition caused by the change in refractive index may be minimized by minimizing the thickness of the low index material.

FIG. 1 depicts a monocentric singlet lens 101 including a physical aperture stop 103. FIG. 1 also depicts a modified two-element lens 102 having an oversized stray light aperture 104, larger in physical diameter than the aperture stop 103. However, the aperture stop 104 includes a virtual aperture stop comprising a TIR layer 106 between the lenses 112 and 110. The TIR layer may be implemented using a low refractive index material, when compared to the lens 110 (which will have a higher refractive index material), enabling thus total internal reflection filtering to occur at the TIR layer 106 as shown at FIG. 1 at lens 102. In this way, the TIR layer 106 may provide the function of a relatively angle-independent, fixed diameter aperture stop.

In some example embodiments, the TIR structure 106, 110, 112 may comprise an air medium between two optical elements, which may be composed of a material such as optical glass or plastic. In some example embodiments, the air medium may comprise a thin spherical air gap between meniscuses (or lenses) 112 and 110. The TIR structure's spherical shape enables the overall light transmission to be more uniform over a wide range of angles, compared to a conventional absorptive aperture.

In some example embodiments, the TIR structure may comprise a liquid layer or a solid layer, such as a thin layer of optical adhesive applied between meniscuses (or lenses) 112 and 110.

Figure 2:
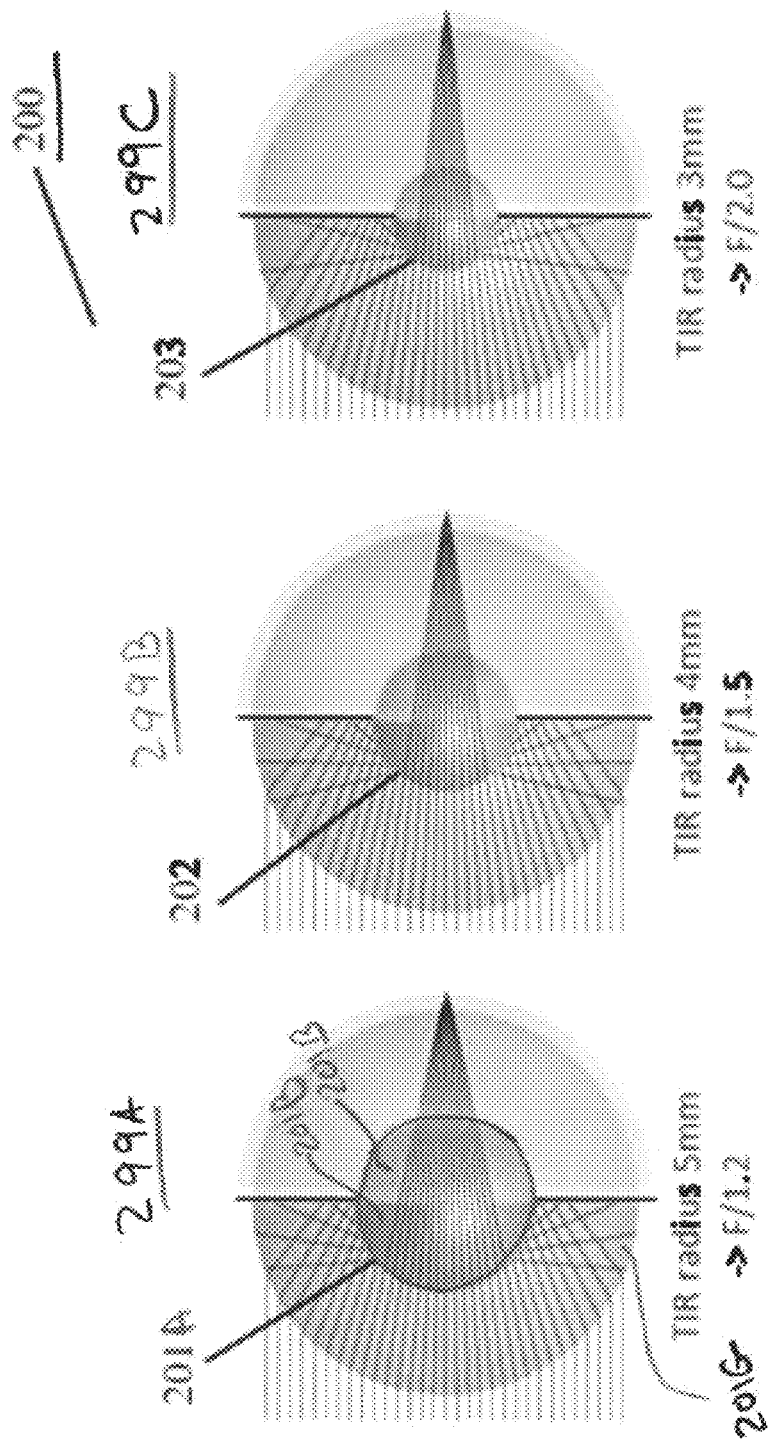
FIG. 2 depicts monocentric lenses including a virtual aperture stop implemented using a total internal reflection layer, in accordance with some example embodiments.

FIG. 2 depicts additional configurations 200 of the monocentric lens including a virtual aperture stop implemented as a TIR layer, in accordance with some example embodiments. The first lens 299A includes a virtual aperture stop formed by placing a TIR layer 201A over a portion of the solid, spherical core lens 201B. Due to the change in refractive index, the TIR layer 201A provides total internal reflection to some of the incident light as it passes from meniscus lens 201G into the lens 201B.

Figure 3:
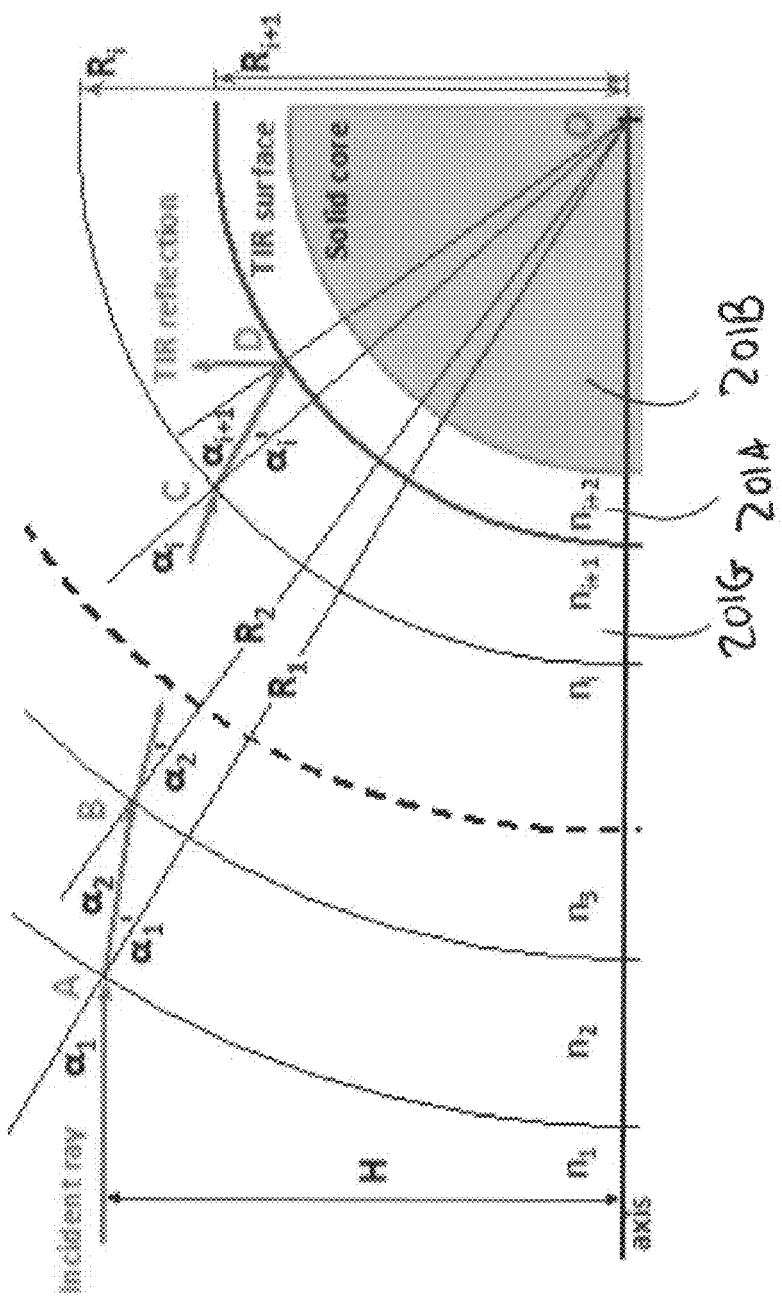
FIG. 3 plots example rays traversing the monocentric lens of FIG. 2.
Figure 4:
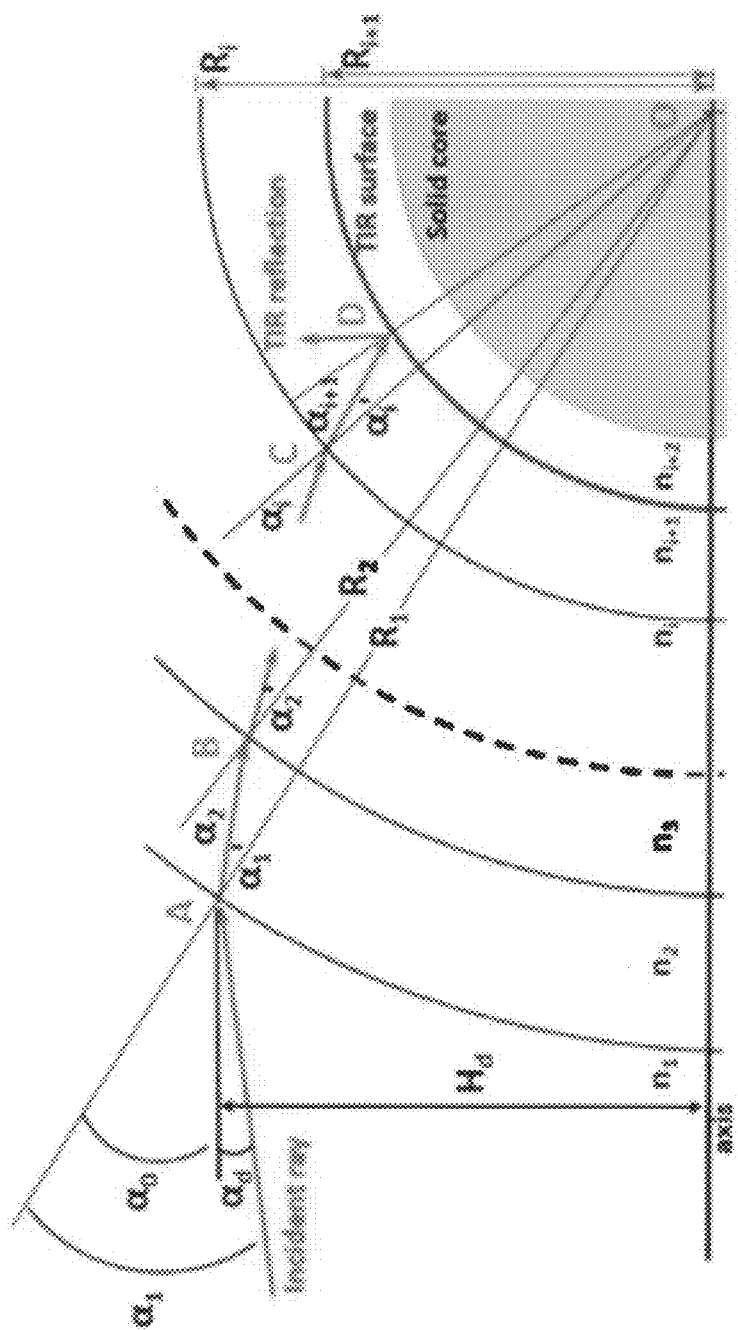
FIG. 4 depicts a schematic of the ray paths into a monocentric lens for an object located at a finite distance.

At FIG. 2, the monocentric lens 299A has a TIR surface at a radius of 5 millimeter (mm), while monocentric lens 299B has a TIR surface at radius of 4 mm, and monocentric lens 299C has a TIR surface at a radius of 3 mm, although other radiuses are possible as well. In some example embodiments, the TIR layer 201A may comprise an air medium, such as a thin spherical air gap, although the TIR layer may be implemented in other mediums as well (e.g., a thin layer of optical adhesive which when cured has a relatively lower index of refraction when compared to the adjacent lens layer(s)). FIG. 3 plots example rays traversing meniscus 201G, TIR layer 201A, and spherical lens core 201B of the monocentric lens 299A.

In some example embodiments, a monocentric lens can be coupled to a field expander lens, which can be placed in in front of the monocentric lens to provide a wider field of view, when compared to implementations not having the field expander lens. The F-number of a lens refers to the len's light collection aperture, and is defined as the lens focal length, F, divided by the diameter of the lens aperture, D (i.e. F-number equals F/D). The TIR virtual stop may be implemented with a range of possible radii of curvature, as noted, and may have a corresponding range of different, such as higher, resulting F-number. In some implementations, one surface of the monocentric lens may be configured to have deviations from monocentricity in order to compensate for the field astigmatism of the negative power of the front attached field expander. In this implementation, the monocentric lens with one non-concentric surface may serve as a surface upon which the TIR layer is placed.

Figure 25:
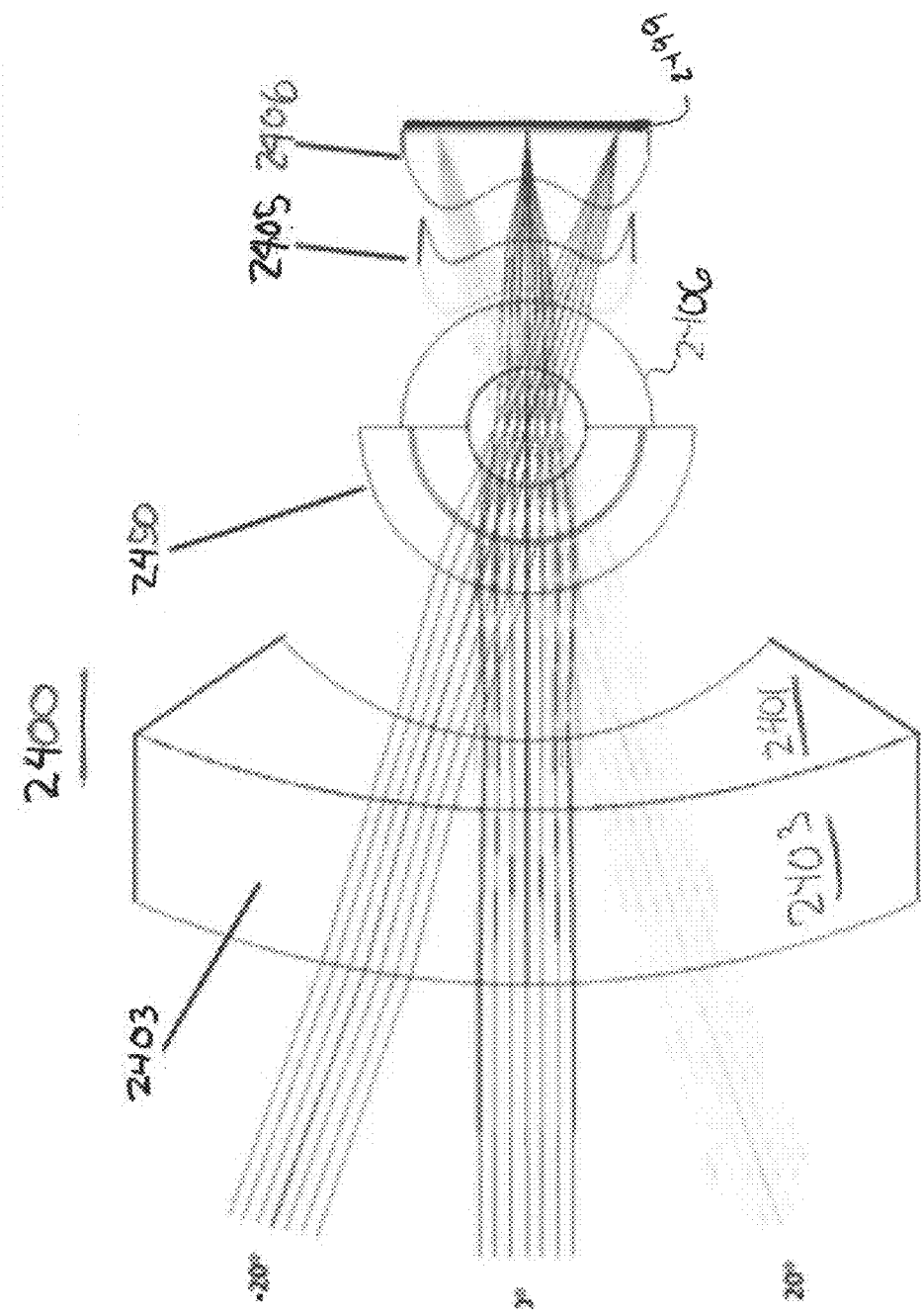
FIG. 25 depicts a side-down view of the lens of FIG. 24 lens having wide horizontal field of view and imaging onto a cylindrically shaped image sensor.
Figure 26B:
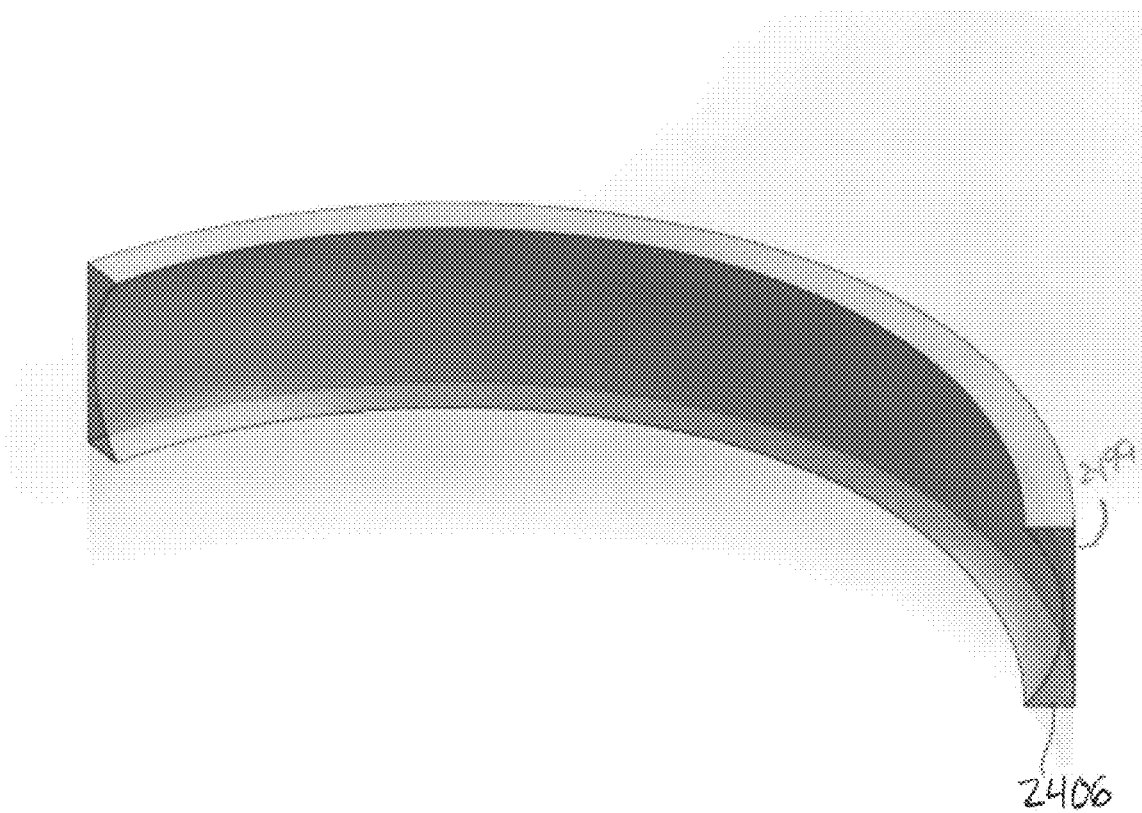
FIG. 26B depicts a portion of a toroidal field flattener.

The focused image formed by an entirely monocentric lens will occur on a spherical surface with a radius of curvature equal to the focal length, as noted. More generally, many lenses may form a focused image on a surface having a spherical shape. Many high resolution image sensors are fabricated using lithography and chemical processing of planar wafers of a crystalline semiconductor, such as silicon. The fabrication of a high resolution image sensor having a spherical shape has been the subject of research and development, for example by using pressure to deform a thin silicon CMOS wafer into an approximately spherical shape. However, the internal stresses in deforming a planar wafer into a spherical surface limit the departure from planarity. In accordance with some example embodiments, an image sensor configured to sense a spherical image surface using the combination of a semiconductor image sensor in a cylindrical shape with one or more optical element having a toroidal aspheric surface(s) 2405/2406 (as shown at FIGS. 25 and 26B). Such an image sensor may provide a deep physical curvature in a first (e.g. horizontal) direction due to the cylindrical shape of the semiconductor image sensor, and provide optical focusing of the input light onto the surface of the cylindrical image sensor in the second (e.g. vertical) direction) due to the optical field flattening of the one or more toroidal aspheric optical element(s). Such an image sensor may be used to replace the fiber taper and image sensor 11604 of FIG. 16B, or the fiber taper 2103 and conventional planar image sensor 2102 of FIG. 21A, or to replace the one or more optical relays 2203 and corresponding planar image sensors of FIG. 22.

Figure 5:
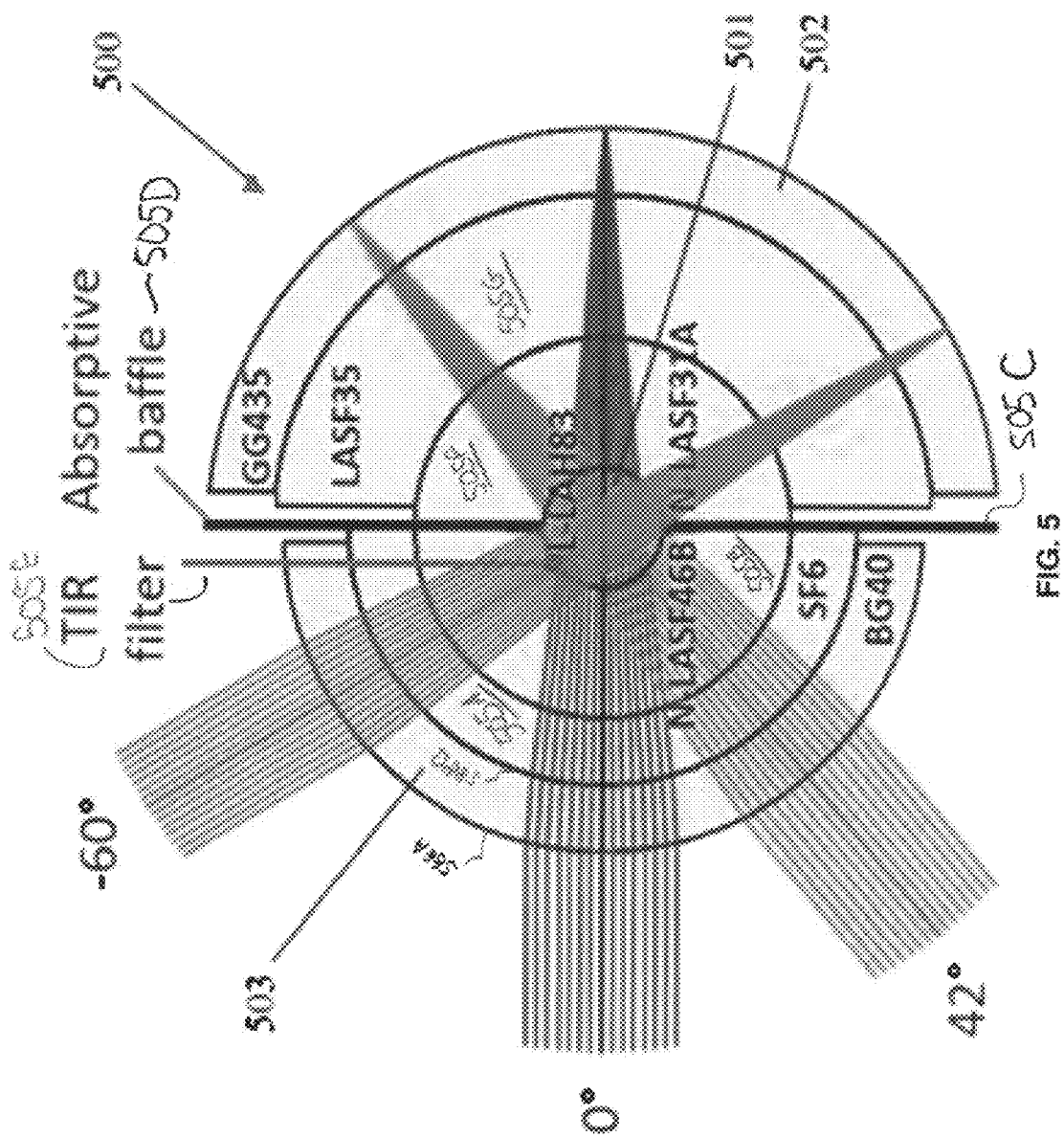
FIG. 5 depicts an example embodiment of a solid monocentric lens, without internal air or gas-filled cavities.

FIG. 5 depicts an example embodiment of a monocentric (MC) lens 500, in accordance with some example embodiments. The MC lens 500 includes lenses/meniscuses 503, 505A, 505B, 501, 505F, 505G, and 502. The TIR layer 505E may be placed between lens 501 (which forms a spherical core, or ball) and lens 505B. An absorptive baffle 505D, such as a black or opaque layer, may be used as well. This baffle is not the lens aperture stop, but is rather an oversized aperture that blocks non-sequential light paths, including some light that is reflected from the TIR layer 505E. In this embodiment, the TIR layer 505E may be implemented using a low refractive index adhesive, which couples the two lenses 501 and 505B and thus provides the TIR layer, in accordance with some example embodiments.

The MC lens 500 may be considered a solid lens assembly as the layers are fixedly coupled and there are no air gaps between the layers. In the example of FIG. 5, the monocentric lens 500 may include no internal air spaces, even before the focal plane. Due to the solid, monolithic construction of lens 500, it may be shock-resistant. In the example of FIG. 5, a 12 mm focal length is used, although other focal lengths may be used as well.

In some example embodiments, the MC lens 500 may be coupled to a single full-frame focal plane (for example, via a curved fiber taper as described in Karbasi, I. Stamenov et al., "Curved fiber bundles for monocentric lens imaging," Paper 9579-13, SPIE Optical Engineering+Applications, San Diego Calif., August 2015) or to multiple CMOS focal planes (for example, by an array of straight fiber bundles as described in I. Stamenov et al., "Panoramic monocentric imaging using fiber-coupled focal planes", Optics Express 22(26), pp. 31708-31721, 2014).

The TIR layer 505E providing the virtual aperture stop may be implemented using an optical adhesive having a refractive index of 1.315 (e.g., NOA1315 is an optical adhesive having a low index of refraction of about 1.315, and is commercially available from Norland Products), although other mediums may be used at the TIR layer as well so long as the index of refraction is relatively lower than the index of refraction of the adjacent lens layers.

With a refractive index of 1.315, the TIR filtering media may yield (see, e.g., Equation (17) at Appendix A below) a 1.825 mm filtering radius value, so the MC lens may be configured around a 3.64 mm diameter solid, spherical core lens 501.

Table 1 below depicts an example of a prescription for various layers of meniscuses/lenses of the MC lens 500. The surface corresponds to the surfaces of the lens assembly at FIG. 5 moving left to right. The radius refers to the curvature of the surface, and the thickness refers to the thickness of the material following the surface. The material refers to the name of the material following the surface. For example, surface 1 corresponds to 588A, surface 2 corresponds to 588B, and so forth through the assembly 500. An optical adhesive (e.g., Norland Optical Adhesive NOA61 having an index of refraction of 1.56) may be used to fixedly couple the lens layers of MC lens 500, while the TIR layer between 501 and 505B may be fixedly coupled using the above-noted NOA1315 material). A fiber taper can be fixedly coupled on the outer meniscus 502 to carry the image to a sensor or detector, although other mechanisms to couple the image to a sensor/detector may be used as well.

TABLE 1

Optical prescription of the solid virtual stop lens of FIG. 5.

| Surface | Radius | Thickness | Material |
|---------|--------|-----------|----------|
| OBJ | infinity | Infinity | |
| 1 | 9.725 | 2.000 | BG40 |
| 2 | 7.725 | 0.010 | Norland NOA61 |
| 3 | 7.715 | 2.054 | SF6 |
| 4 | 5.661 | 0.010 | Norland NOA61 |
| 5 | 5.651 | 3.826 | N-LASF46B |
| 6 | 1.825 | 0.005 | Norland NOA1315* |
| 7 | 1.820 | 3.640 | L-LAH83 |
| 8 | −1.820 | 0.01 | Norland NOA61 |
| 9 | −1.830 | 3.826 | N-LASF31A |
| 10 | −5.656 | 0.010 | Norland NOA61 |
| 11 | −5.666 | 4.300 | LASF35 |
| 12 | −9.966 | 0.010 | Norland NOA61 |
| 13 | −9.976 | 2.000 | GG435 |
| 14 | −11.976 | 0.010 | Norland NOA61 |
| IMA | −11.986 | | Sensor/fiber bundle (not shown) |

This type of lens may directly contact a fiber bundle that carries the image to a sensor, such as a backside illuminated sensor CMOS focal plane. In such wide-angle monocentric lenses, infrared and ultraviolet spectral filtering can be performed using a substantially angle-independent mechanism, such as by use of one or more lens elements made of a color absorption glass, rather than a potentially angle-dependent dielectric coating on a planar cover. In the specific exemplary lens design described in FIG. 5, the infrared spectrum will be absorbed by the front BG40 lens, meniscus, 503, and the UV light will be absorbed by the rear GG435 mounting meniscus 502.

Figure 6:
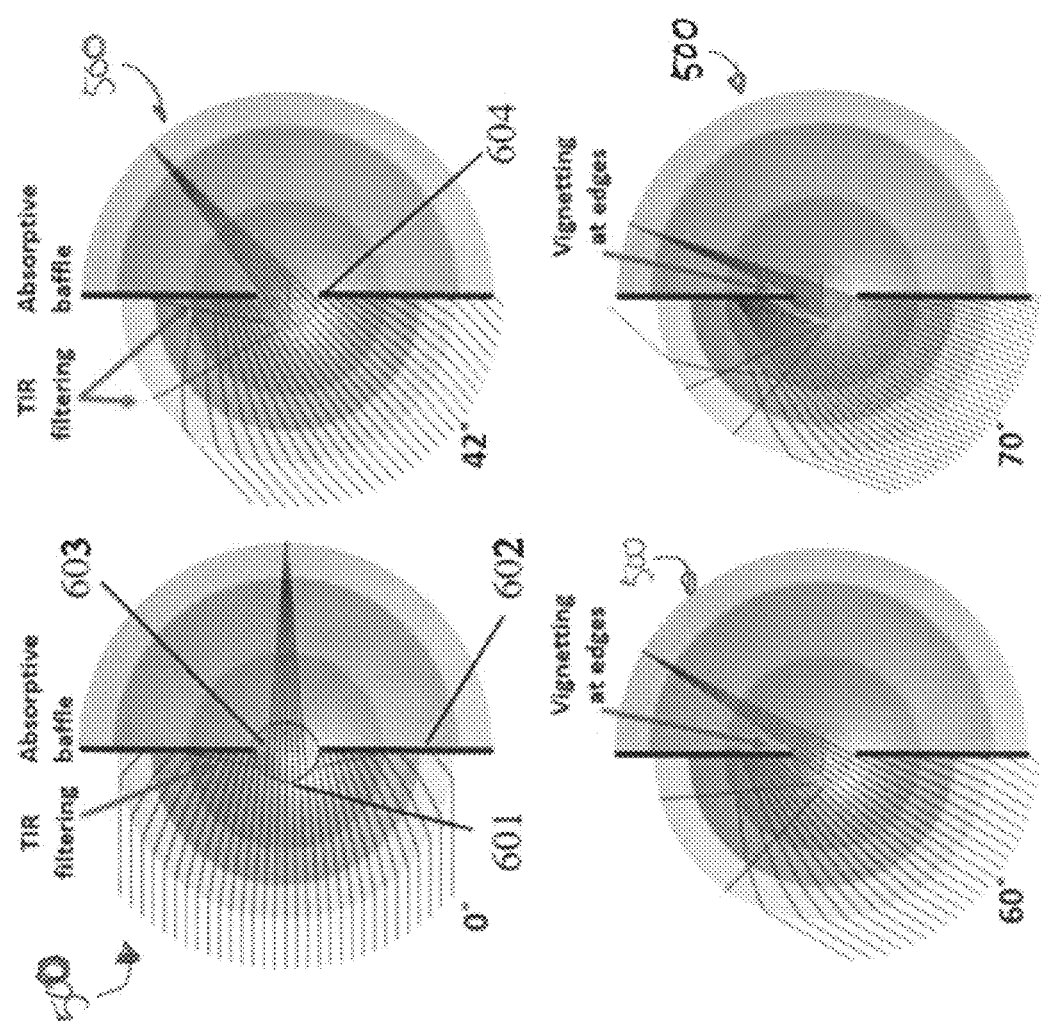
FIG. 6 plots light rays at various degrees for a solid monocentric lens.

FIG. 6 plots light rays at 0, 42, 60, and 70 degrees for the MC lens 500. TIR filtering at the TIR layer 601 occurs with for example an F-number of 2.5 and an aperture radius of 1.825 mm, although these values are for illustrative purposes as other F-numbers and aperture radius values may be used as well. In the example of FIG. 6, the MC lens 500 includes an oversized physical (e.g., absorptive black paint) stray light baffle 602 (which corresponds to 505D at FIG. 5) on the rear edge of the front meniscus lens, ending at the edge of the central spherical core lens 603. The baffle 602 may block non-sequential paths of rays traveling with a very high aperture, as well as light that may be reflected from the TIR surface. At the 42° field angle, the marginal ray 604 in the tangential plane meets the physical baffle 602, and vignetting begins. Vignetting in lens design refers to the light signal obscuration internal to the lens. At the 60° field angle shown in FIG. 6, vignetting affects both the upper and lower parts of the beam.

Figure 7:
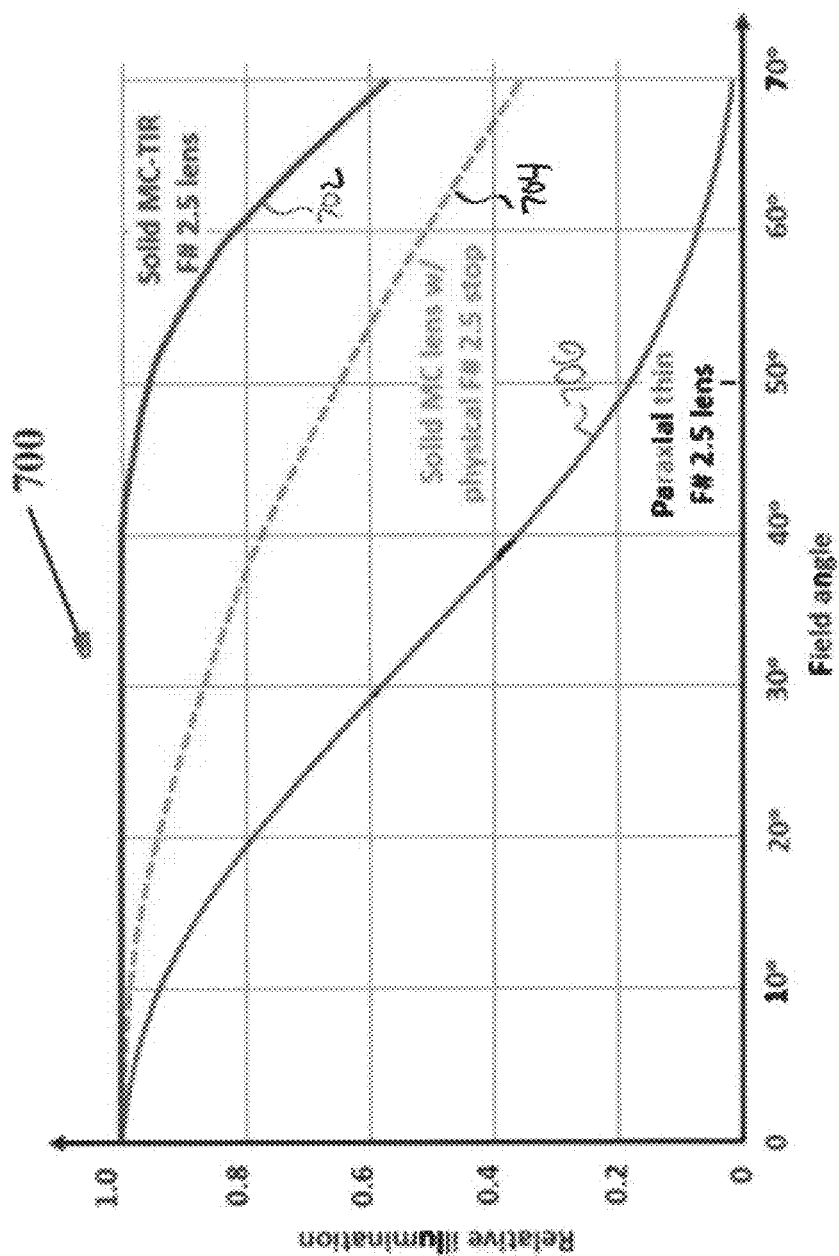
FIG. 7 shows relative illumination curves for a solid monocentric lens.

To illustrate and compare the impact of the virtual aperture stop on light collection, the lens can be modified with the addition of a conventional F-number 2.5 physical stop at the center. Transmission at center of the field is unchanged, but this physical aperture prevents the advantageous operation of the virtual stop aperture, and so may introduce cosine loss at larger field angles. FIG. 7 shows the relative illumination curves 700 for the solid MC lens 500 including the TIR layer (plot 702) compared to a solid MC lens the addition of a conventional aperture stop (plot 704), and a thin paraxial lens (plot 706) with a conventional aperture stop. The plot 702 shows relative illumination improvement at all angles, including above the 42° angle where vignetting begins in the TIR lens, when compared to the other lens plotted at 704 and 706.

Figure 8:
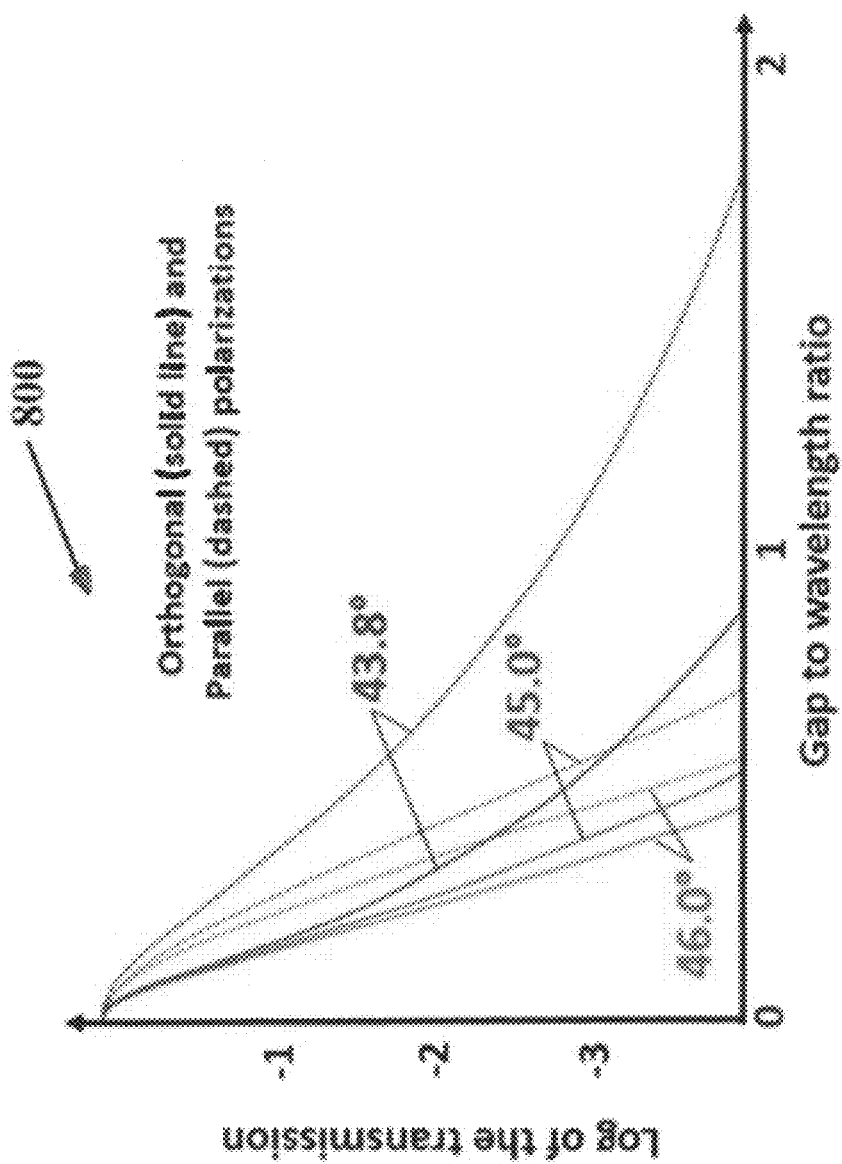
FIG. 8 shows transmission curves as a function of thickness of the TIR layer.

TIR occurs when there is a high index to low index material transition, but when the low index material is followed by a high index material, there is a limit to how thin the gap can be and still provide total reflection. If the thickness of the low index material is small compared to the wavelength of light, the total internal reflection is described as being "frustrated" and some or all of the incident light will be transmitted across the low index gap. The minimum thickness necessary to maintain TIR at the TIR layer may be determined by coupling of evanescent field (e.g., frustrated TIR) across a gap that approaches the skin-depth penetration of the electromagnetic field. The transmission may be accurately determined by treating the gap as a thin film and using Maxwell's equations. See, e.g., S. Zhu et al., "Frustrated total internal reflection: A demonstration and review," Am. J. of Physics, 54(7), pp. 601-607, 1986. In the MC lens 500, the TIR surface 505E may be formed by a relatively low refractive index layer (e.g., a refractive index of 1.315 as found in NOA1315) surrounded with a lens layer 505B (with, e.g., N-LASF46B glass having a refractive index of 1.9) and the spherical core layer 501 (with, e.g., L-LAH83 glass having a refractive index of Nd=1.864). The TIR angle for incident light is about 43.8°. FIG. 8 shows transmission curves 800 for the glass lens combinations as a function of thickness of the TIR layer 505E measured in wavelengths of the incident light. Even for the FTIR angle, an adhesive layer of only 2 wavelengths thickness is sufficient to prevent measurable transmission. For a visible wavelength lens, a gap larger than 1 μm is sufficient. For glass substrates separated by an air gap, a 1.5 μm air gap is sufficient to prevent FTIR. The lens may be designed with any gap which is larger than this value, and retain the desired TIR light reflection behavior. A 5-micron thick gap may be used as an illustrative value, recognizing that a smaller or large value may work as well.

Figure 9:
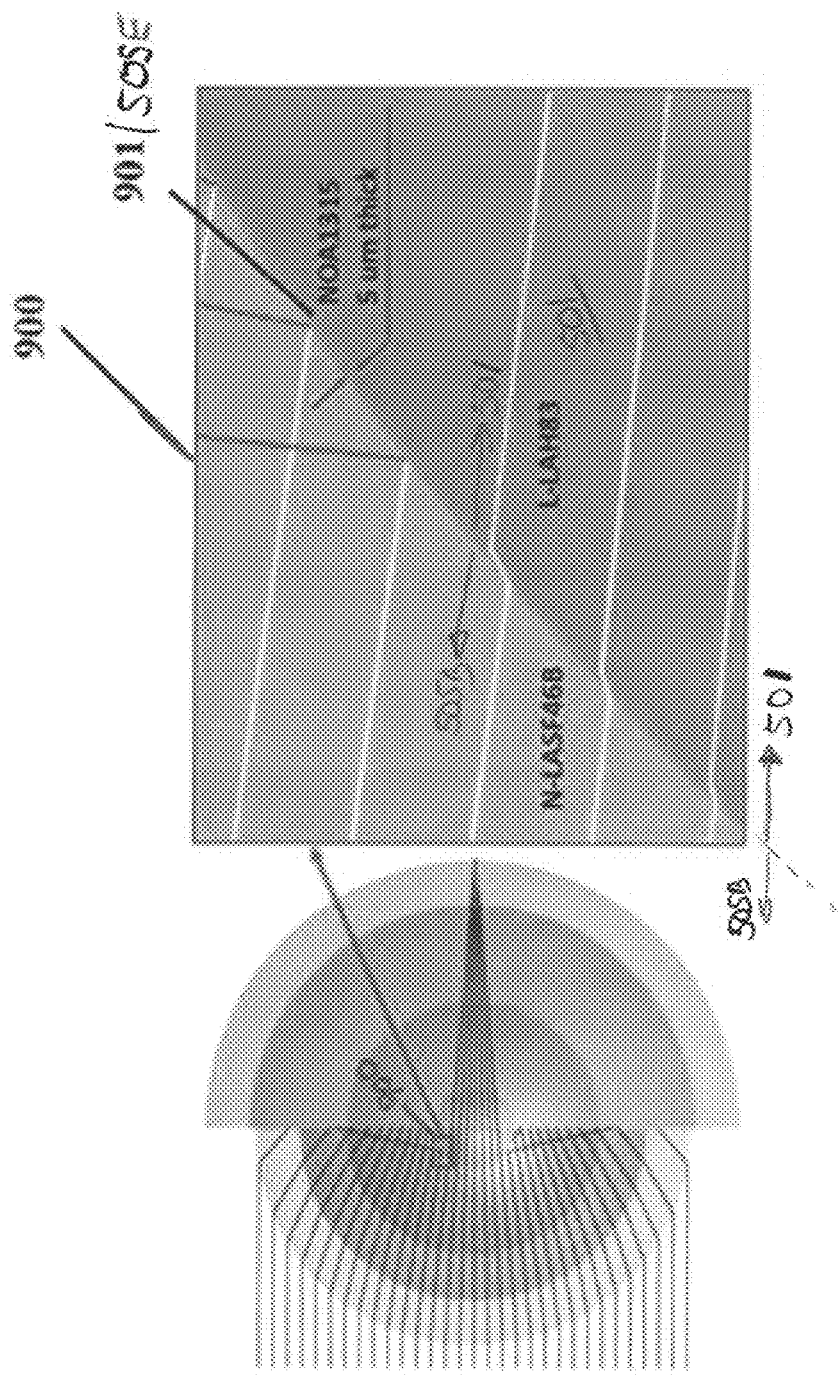
FIG. 9 shows the ray path near the TIR layer transmission-to-reflection transition.

To constrain aberrations at the edge of the virtual pupil 900 formed by the spherical MC core lens 501, the TIR layer serving as a TIR filtering media 901/505E should be kept relatively thin as shown at FIG. 9. In the example, the lens layer 505B (see, also FIG. 5) is coupled to lens layer 501 via a 5 micron thick layer 901/505E of optical adhesive such as NOA1315, and this optical adhesive provides the TIR layer 505E. In the example of FIG. 9 (which also corresponds to MC lens 500), the core layer glass (N-LAH83) 505C and the outer layer glass (N-LASF46B) have a thermal coefficient of expansion (TCE) that differ by only 0.8 ppm/° C. to maintain the relative position of the layers due to thermal expansion/contraction, and avoid having the surfaces between the thin TIR layer make contact.

Figure 10:
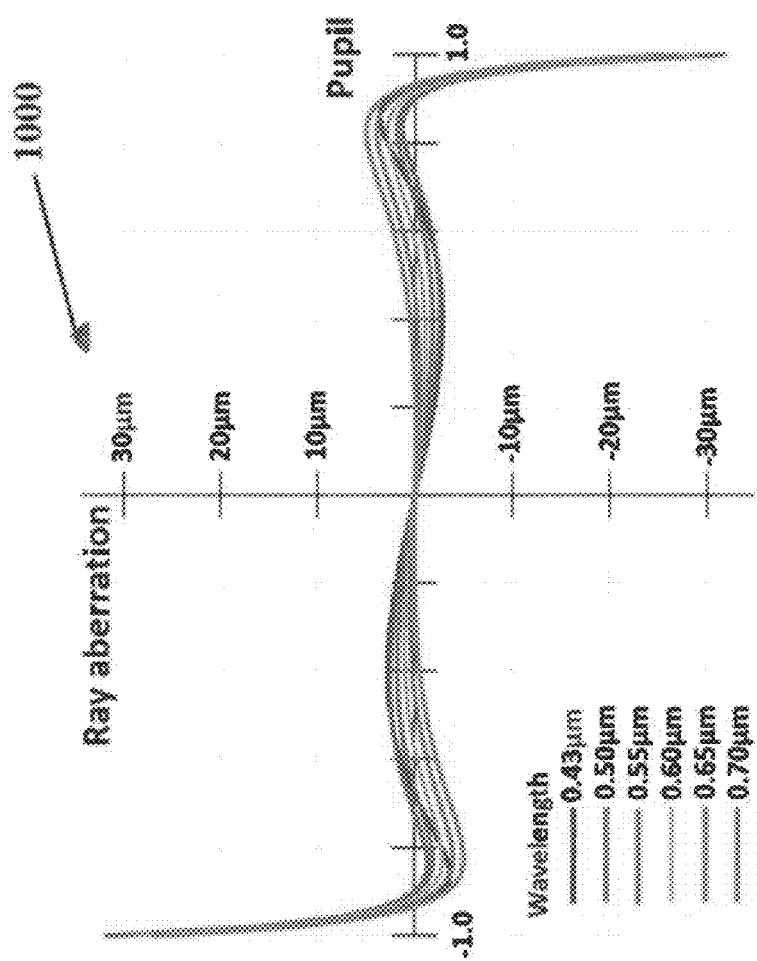
FIG. 10 show a transverse ray aberration plot for a solid monocentric lens.
Figure 11:
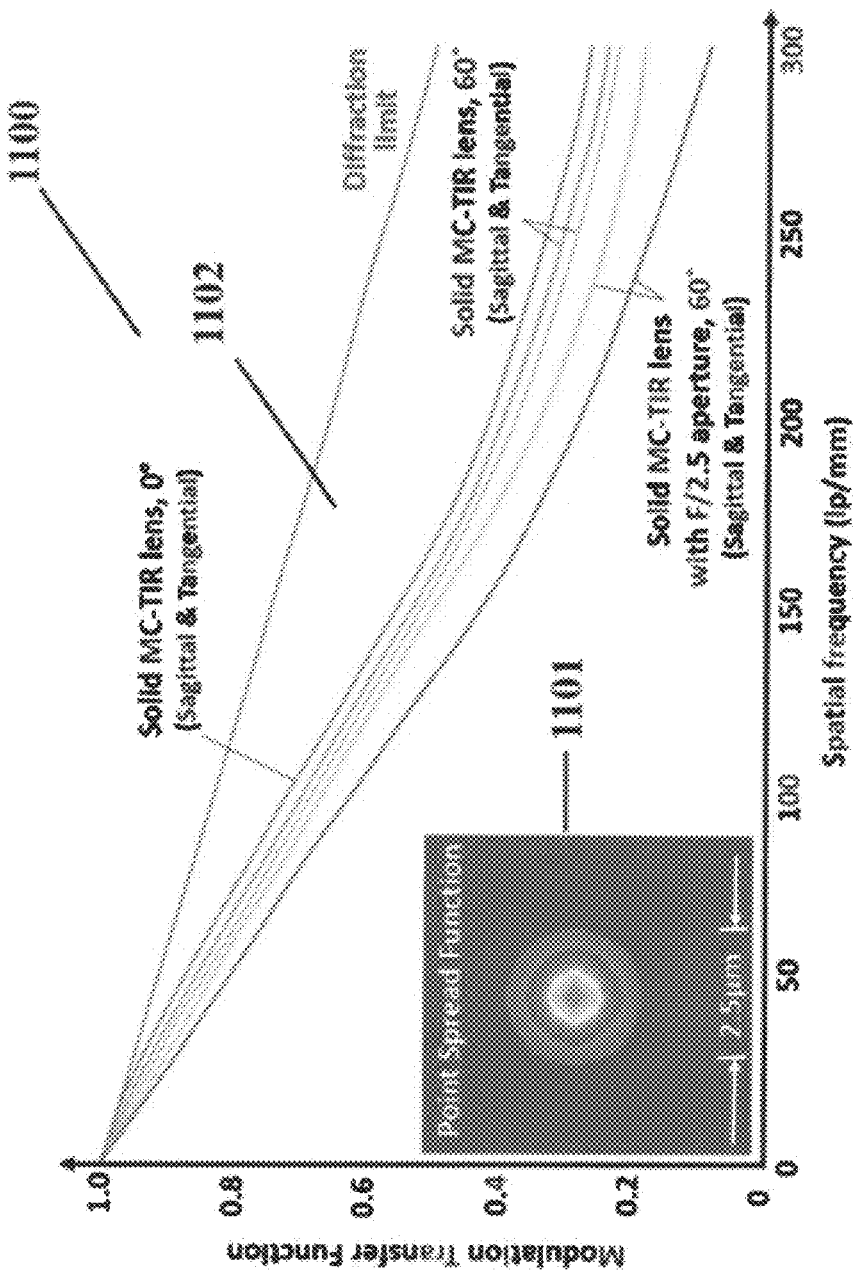
FIG. 11 shows a diffraction plot spread function and a plot of modulation transfer function versus frequency.
Figure 12:
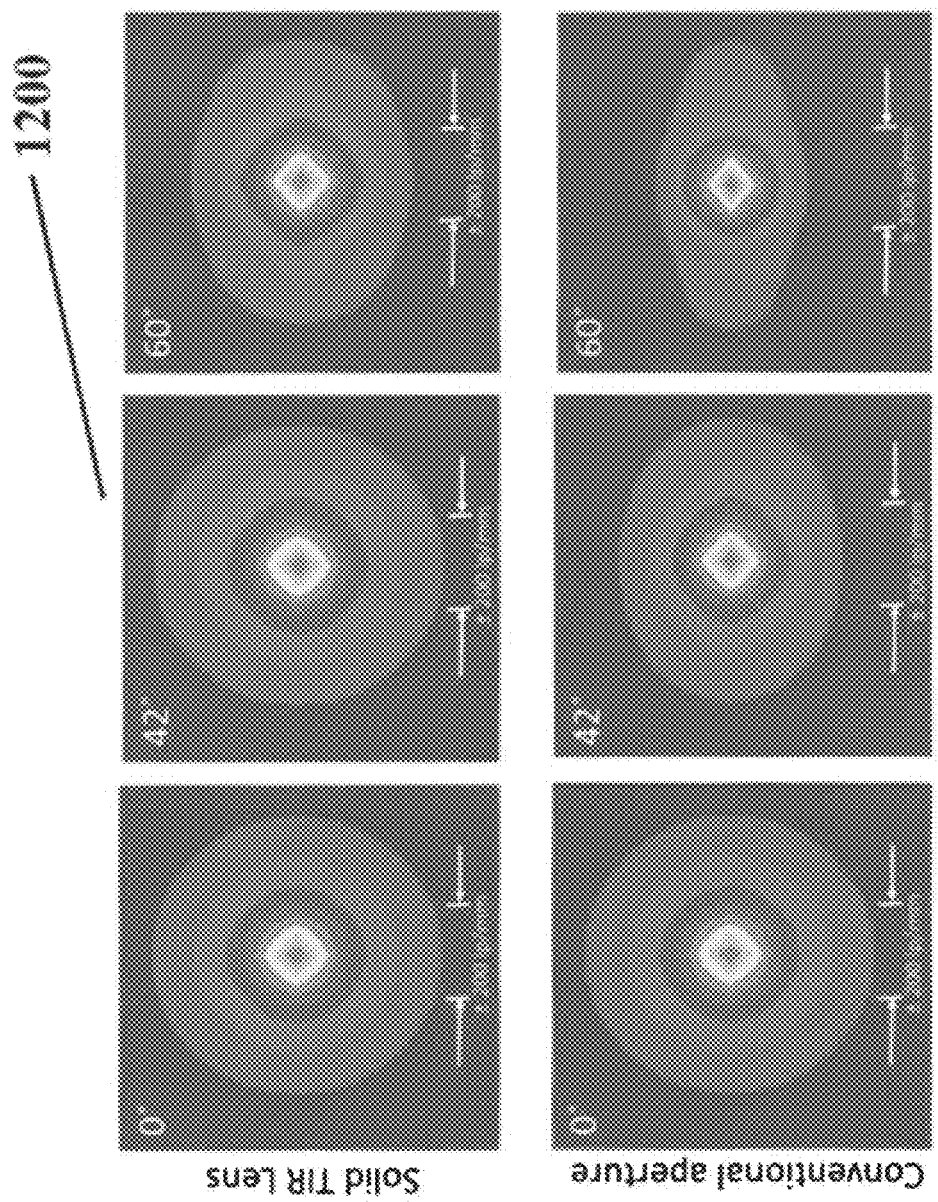
FIG. 12 shows a plot of diffraction modulation transfer function versus incidence angle for lenses with conventional aperture stop and with a virtual aperture stop.

FIG. 10 depicts a transverse ray aberration plot 1000 for the solid MC lens 500. At 95% of the pupil, aberrations are under 5 μm, then grow at the TIR transition area (see, e.g., FIG. 9). The solid TIR lens 500 nominal performance 1100 for the visible light is a tightly confined diffractional impulse response 1101 as shown in FIG. 11 (left inset at 1101), with a sub-micron full width at half maximum within a 2.5 μm overall diameter envelope. This may mean that due to Fresnel reflection coefficients the TIR transition area contains insufficient energy to significantly impair image quality. Further reduction of the filtering media thickness from 5 μm to 2 μm may reduce the peak-to-valley aberration from 33 μm to 5 μm, but this may not measurably improve the as-fabricated image resolution. The lens modulation transfer functions (MTF) 1102 shown in FIG. 11 indicates high resolution (within the vignetting-free field, with amplitude of 0.42 at 200 lp/mm) versus the 0.66 diffraction limit. The MTFs 1200 of the lens with virtual and physical aperture stop at 0°, 42° and 60° field points are compared in FIG. 12, showing the resolution advantage of the virtual stop.

Figure 13:
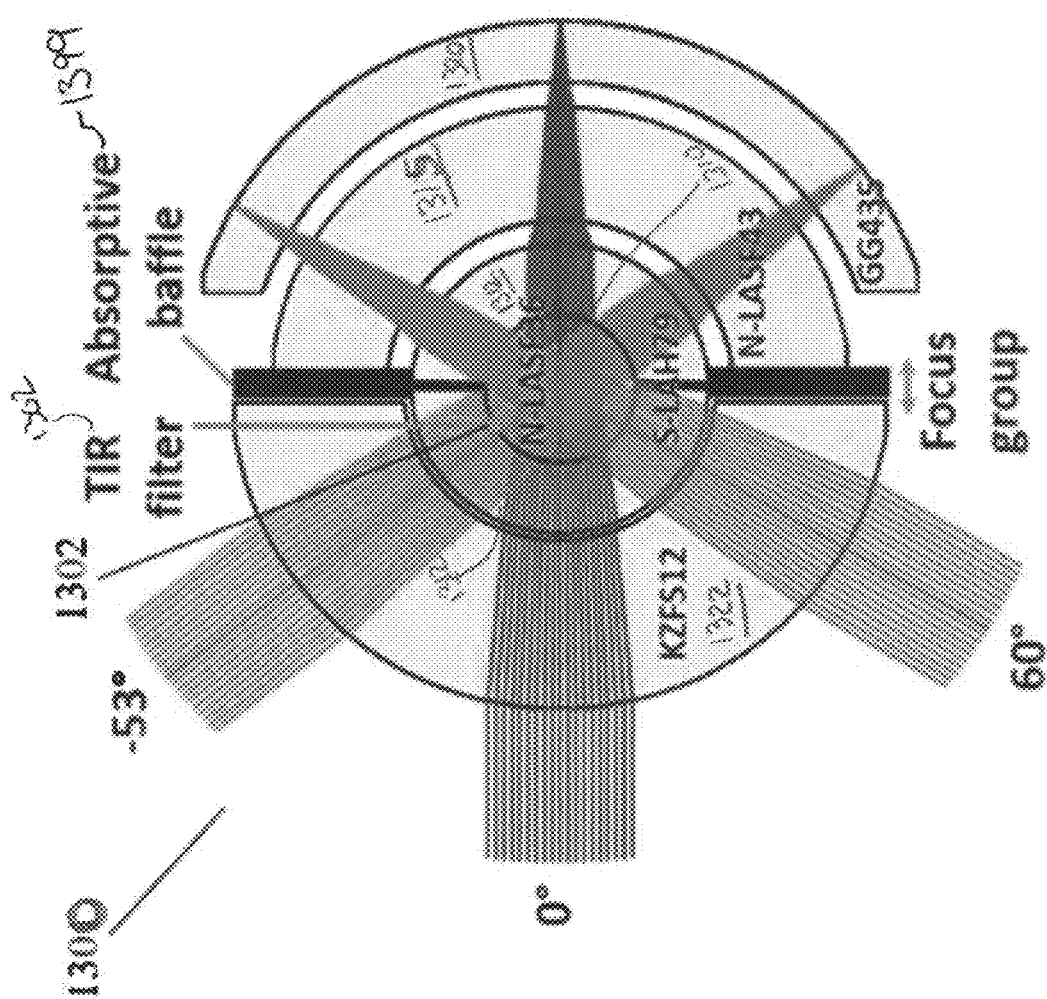
FIG. 13 depicts another example of a monocentric lens including a total internal reflectance layer at the interface of an internal air cavity or gap.

FIG. 13 depicts an example implementation of an MC lens 1300 including a TIR layer 1302, in accordance with some example embodiments. MC lens 1300 is similar to MC lens 500 in some respects but the TIR layer 1302 is implemented as a cavity, such as an air gap, in accordance with some example embodiments. The cavity, or gap, may be filled with air or other transparent gas, or may be evacuated so that the cavity provides a full or partial vacuum. The cavity or gap must have a lower refractive index, when compared to the adjacent layers, so the cavity can form a TIR layer providing a virtual aperture stop.

A limit to the vignetting-free field of view in the solid lens 500 (which can be seen in FIG. 6) may be related to the diameter of the transmitted image beam at the center of the MC lens. Vignetting can begin at a field angle of 42°, when the marginal ray touches the sag of the adjacent meniscus. Equation 18 (see, Appendix A below) shows that reducing the refraction index of the filtering media can increase the ratio between the diameter of the central, spherical ball 1310/501 and the diameter of the beam, yielding a relatively perfect uniform light collection and resolution over a larger field of view.

In the solid lens 500 example above, the TIR filtering media is a liquid and/or solid medium such as an adhesive which cures to a refraction index 1.315. Replacing this adhesive with an air gap may increase (e.g., by 1.315 times) the diameter of the central, spherical core (see, e.g., 501/1310) in order to maintain a specified F/2.5 aperture for example (and this increase may also increase the vignetting-free field of view).

The MC lens 1300 including an air gap as the TIR layer 1302 between a spherical, core lens 1310 and another lens 1312 is shown at FIG. 13. The MC lens may include a plurality of lens layers 1322, 1312, 1310, 1315, and 1320. These lens layers may be implemented in a material such as glass having certain physical properties (e.g., refractive index). Table 2 below depicts an example prescription for the plurality of lens layers 1322, 1312, 1310, 1315, 1318, and 1320, as well as the air gaps. The surface corresponds to the surfaces of the lens assembly at FIG. 13 moving left to right. The radius refers to the curvature of the surface, and the thickness refers to the thickness of the material following the surface. The material refers to the name of the material following the surface.

TABLE 2

Optical prescription of the TIR air-gap virtual stop lens 1300.

| Surface | Radius | Thickness | Material |
|---|---|---|---|
| OBJ | infinity | infinity | |
| 1 | 10.477 | 5.506 | KZFS12 |
| 2 | 4.971 | 0.240 | Air |
| 3 | 4.731 | 2.331 | S-LAH79 |
| 4 | 2.400 | 0.005 | air* |
| 5 | 2.395 | 4.790 | N-LAF36 |
| 6 | −2.395 | 0.01 | Norland NOA61 |
| 7 | −2.405 | 2.331 | S-LAH79 |
| 8 | −4.736 | 0.78 | Air |
| 9 | −5.516 | 3.703 | N-LASF43 |
| 10 | −9.219 | 0.793 | Air |

TABLE 2-continued

Optical prescription of the TIR air-gap virtual stop lens 1300.

| Surface | Radius | Thickness | Material |
|---|---|---|---|
| 11 | −10.012 | 2.000 | GG435 |
| 12 | −12.012 | 0.01 | Norland NOA61 |
| IMA | −12.022 | | Sensor/fiber bundle |

FIG. 13 and Table 2 show an example the layout of MC lens 1300, with the 12 mm focal length and F/2.5, although other focal lengths and F-numbers may be used as well. Moreover, the prescriptions disclosed herein are provided for illustrative purposes, and other prescriptions may be used as well that include the virtual aperture stop implemented using a TIR layer.

For example, in lens 1300, a 5 μm air gap 1302 is located at a radius of 2.4 mm from the lens center, before a central ball 1310 of radius 2.395 mm. This lens 1300 is designed to operate over a wide spectrum, with a color or monochrome focal plane. The overall visible spectrum weighting for lens optimization and image analysis may be about 0.25 at 430 nm, 0.7 at 450 nm, unity from 500-650 nm. For this lens 1300, the spectrum may also include infrared weighting of 0.9 for 700 nm light, falling to 0.8 at 800 nm, 0.45 at 900 nm, and 0.08 at 1 μm. This is consistent with the responsivity of a sensor or detector, such as a back-illuminated CMOS focal plane, where the uncorrected UV spectrum can be absorbed using a Schott GG435 color glass filter as the mounting meniscus (in contact with the spherical focal surface). The lens 1300 can be refocused from infinity to a 500 mm object distance by axial translation of the central group relative to the mounting meniscus. The core glass ball/sphere 1310 may be implemented using N-LASF36 (having an index of refraction of 1.797117, and commercially available from Schott), and the outer TIR filtering gap glass 1312 may be implemented using S-LAH79 glass (which has an index of refraction of 2.003, a thermal coefficient of expansion (TCE) that differs by 0.36 ppm/° C. to insure stability of the air gap within a 0° to 50° C. temperature range, and is commercially available from Ohara Corporation).

Figure 14:
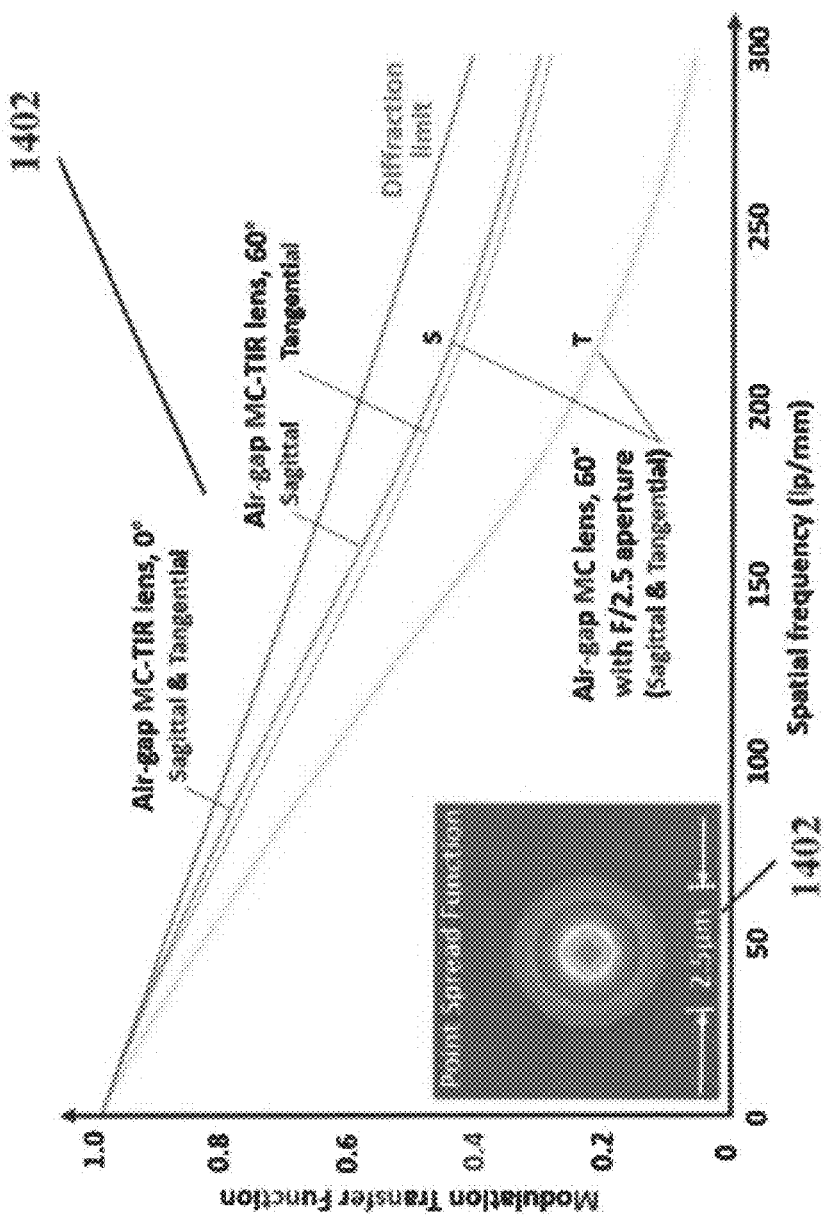
FIG. 14 plots the modulation transfer function versus frequency for the air-gap monocentric lens.

With MC lens 1300, the resulting substantially vignetting-free full field of view may be increased, when compared to the solid lens 500. The air-gap lens diffraction power spread function 1401 and modulation transfer function 1402 are plotted at FIG. 14.

Figure 15:
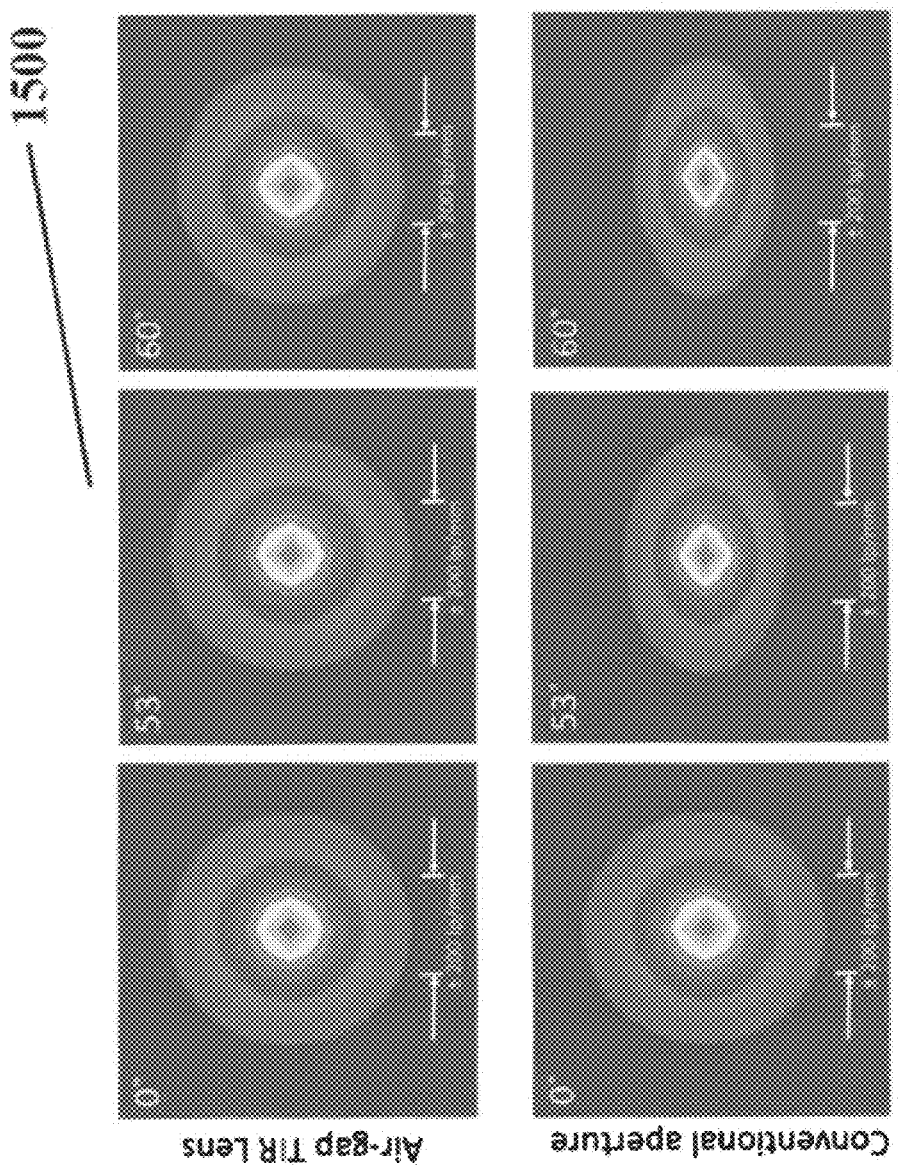
FIG. 15 plots diffraction modulation transfer function plot for the monocentric lens with a conventional aperture and with an air-gap virtual aperture.

FIG. 15 plots diffraction modulation transfer function plot 1500 for 0°, 53° and 60° field angles, demonstrating a relatively perfectly uniform light collection and image response within a 106° full field of view. At angles above +/−53°, the vignetting may begin, slowly increasing with field angle.

Figure 16:
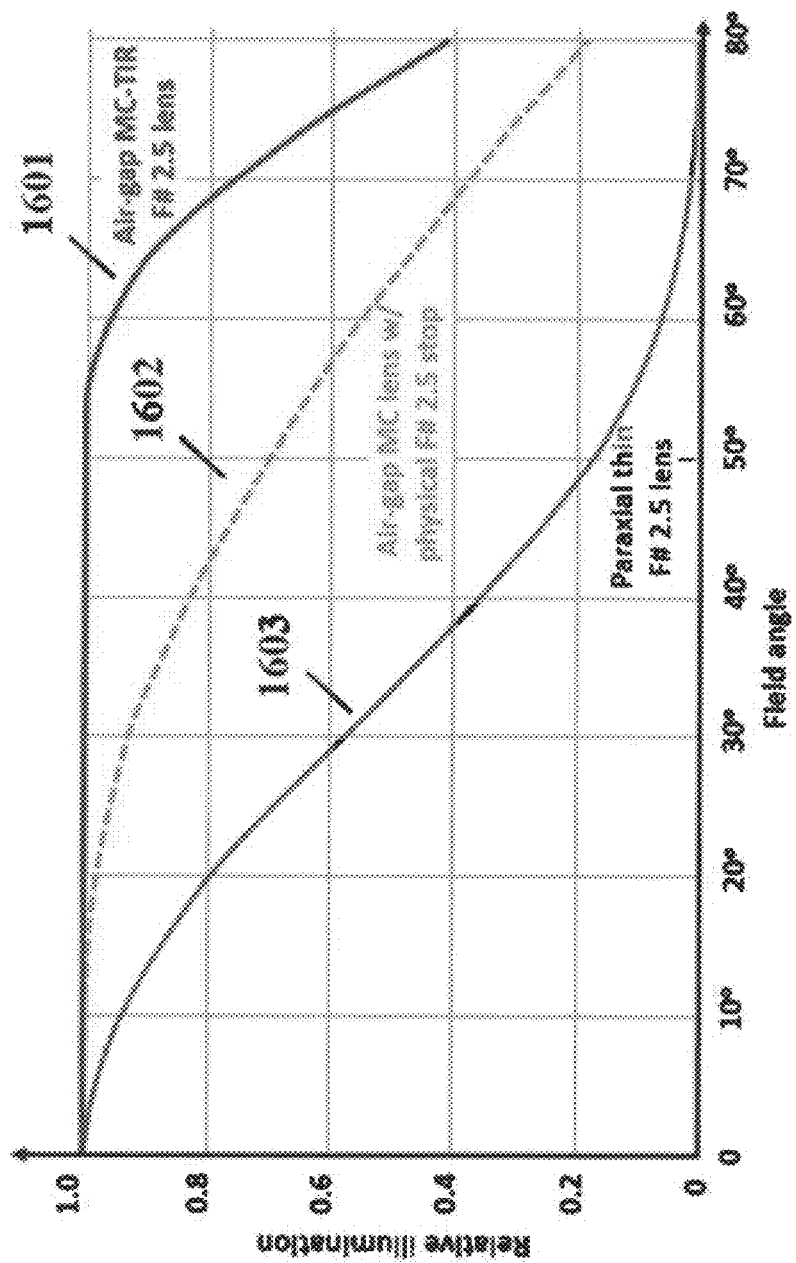
FIG. 16A plots relative illumination versus field angle for and ideal thin lens, and for the monocentric lens with a conventional aperture and with an air-gap virtual aperture.
FIG. 16B depicts wide angle lenses with the solid and air-gap virtual stop as well as a conventional reverse telephoto fisheye lens.
FIG. 16C plots the relative illumination of the fisheye lens of FIG. 16B and the air-gap virtual stop lens of FIG. 13.

FIG. 16A plots relative illumination versus field angle for the MC lens 1300 having an air gap (plot 1601), and plots for comparison an MC lens (plot 1602) having a physical aperture stop (rather than the virtual aperture stop provided by the TIR layer) and a thin singlet lens (plot 1603).

Figure 16B:
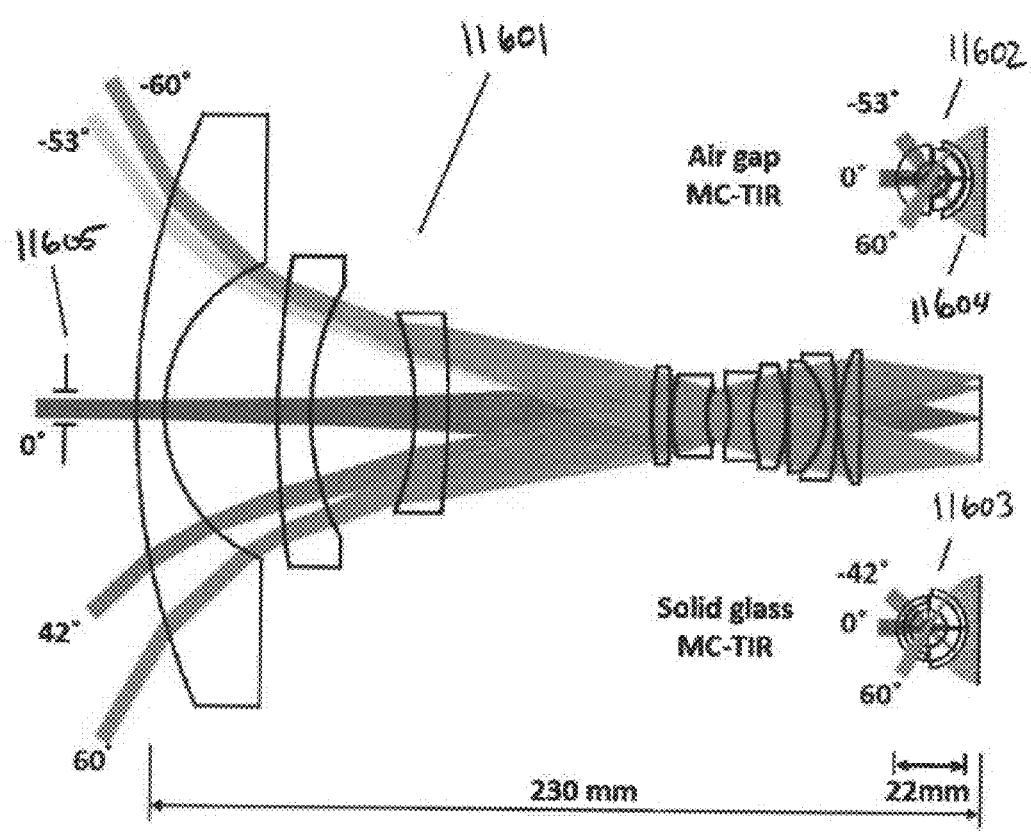
Figure 16C:
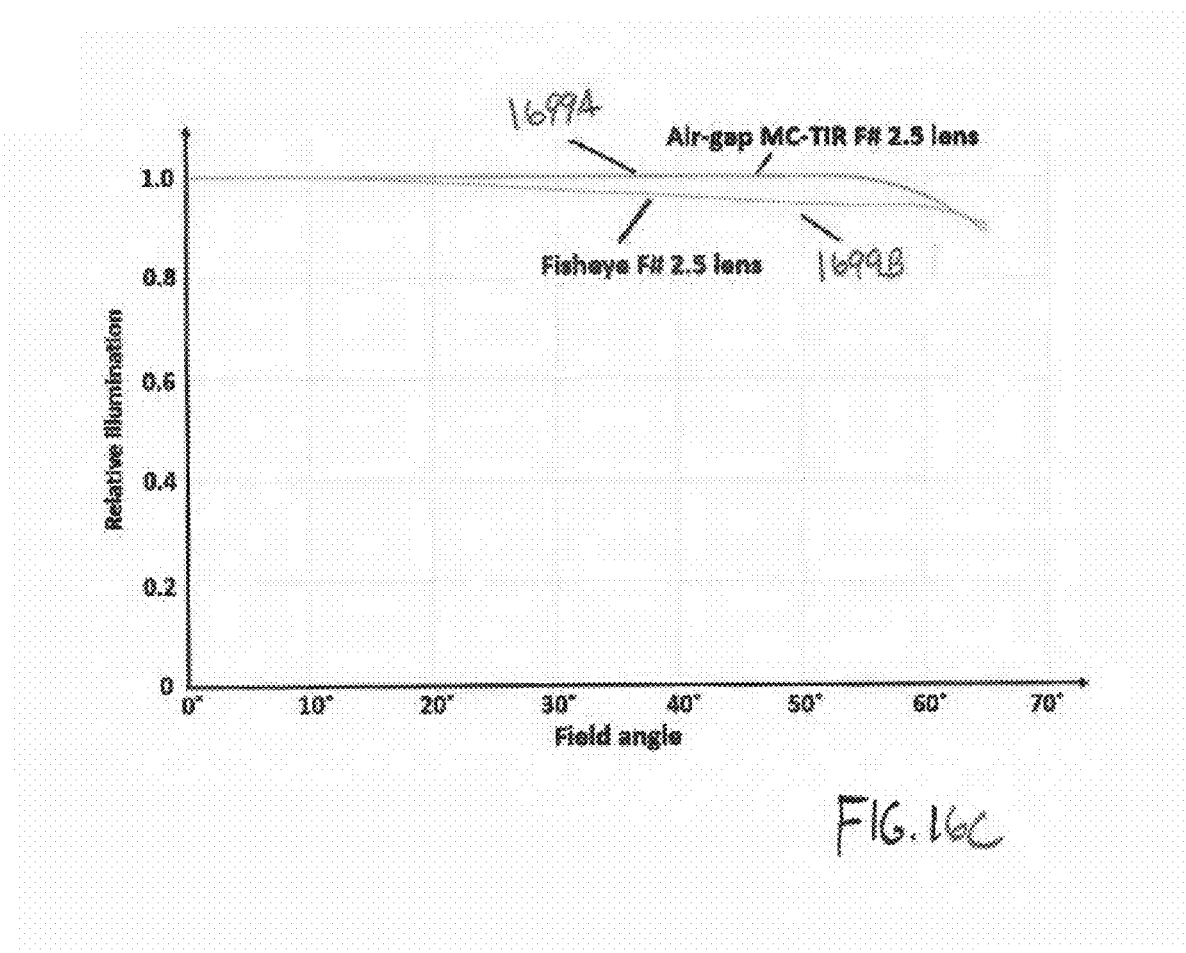

Several architectures of conventional lenses have been developed specifically to provide uniform wide field imaging. Reverse-telephoto fisheye lenses and double meniscus anastigmats like Topogons can be designed to operate with a field of view comparable or larger than MC lenses. The large residual aberrations of Topogon lenses limit the achievable aperture, however, and high operational F/# lenses are inferior to MC lenses in terms of light energy collection and achievable resolution. However, reverse-telephoto fisheye lenses can be designed with larger apertures, and can be designed as telecentric in image space. Such telecentric lenses can eliminate one of the classic cosine-fourth losses in field illumination, the one associated with tilted incident principal ray angle at the image plane. Pupil aberrations contribute an additional improvement in field illumination of fisheye lenses, by increasing the entrance pupil size near the field edge. These attributes make the reverse-telephoto fisheye a currently preferred structure for long focal length wide angle imagers, including high performance cinematography and digital single lens reflex cameras. To compare the MC-TIR lens configurations disclosed herein to these architectures, the ZEMAX "ZEBASE" library fisheye lens, #F005 was used, and then the focal length was scaled from 21.3 mm to F=12 mm and re-optimized with a F/2.5 aperture while enforcing telecentricity. The optimized lens 1701 is shown in FIG. 16B, along with the air-gap 11602 and solid glass 11603 MC-TIR lens, including a representative curved fiber bundle 11604 that has been used to couple a 124° full field of view spherical image surface to a conventional full-frame focal plane. The fisheye lens is some 10× longer than the MC-TIR lenses, even including the fiber bundles. The weight of the glass elements in this fisheye is 1.8 kg, while the MC lens element weight is only 17 grams. In this fisheye lens, the diameter of entrance pupil 11605 increases toward the edge of the field due to pupil aberration. For 60° field, the entrance pupil in the Sagittal direction is 1.2× larger than for axial light, while in the Tangential direction the pupil is compressed by a factor of only cos (42°). Combined with the image-space telecentricity in image space, this yields the highly uniform field illumination curve 1699B shown in FIG. 16C, nearly as high as the MC-TIR lens 1699A. This comparison is still incomplete, however, as it omits angular resolution. The MC-TIR lens which resolves 350 lp/mm at the MTF contrast 0.2 over the full field, while this fish-eye resolves 130 lp/mm on-axis and 100 lp/mm at 60°. The spatial sampling in fiber-coupled imaging systems is limited by the >2 μm fiber pitch, but is still sufficient to take advantage of the virtual stop MC lens resolution as well as light collection.

Figure 17:
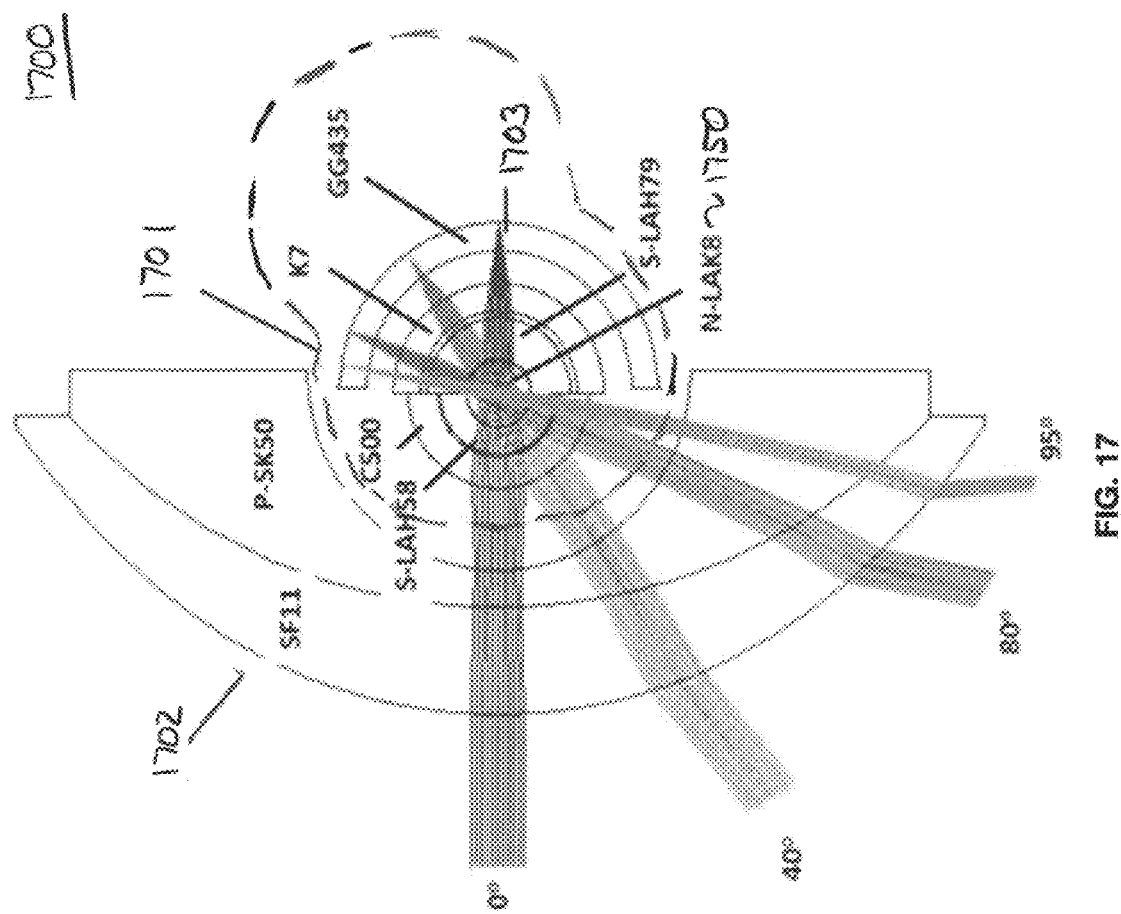
FIG. 17 depicts an example of a lens assembly including a non-monocentric negative lens group lens followed by monocentric lens elements including a total internal reflectance layer.

FIG. 17 depicts an example of a lens assembly 1700, in accordance with some example embodiments. FIG. 17 depicts a combination of an MC lens 1701 (as shown within the dashed line) with a field expander lens assembly 1702 comprising two lenses labeled SF11 and P-SK50, which refer to the name of the glass used in the lenses. In some implementations, the lens assembly 1700 may have a field of view of about 190 degrees, for example. The field expander 1702 may comprise a fish-eye head type negative component lens. The optical prescription of the lens assembly 1700 is shown at Table 3 below, although as noted above other prescriptions may be implemented as well. The surface corresponds to the surfaces of the lens assembly at FIG. 17 moving left to right. The radius refers to the curvature of the surface, and the thickness refers to the thickness of the material following the surface. The material refers to the name of the material following the surface, while $N_d$ represents the index of refraction and $V_d$ corresponds to the Abbe number. While for the wide spectrum band refraction index simulations were used, polynomial models $N_d$ and Abbe numbers are given for the optical materials to insure the right glasses identification.

TABLE 3

Optical prescription of the 190° TIR air-gap virtual stop lens.

| Surface | Radius | Thickness | Material | $N_d$ | $V_d$ | Comments |
|---|---|---|---|---|---|---|
| OBJ | Infinity | infinity | | | | |
| 1 | 19.336 | 3.537 | SF11 Schott | 1.7885 | 25.75 | Aspherical |
| 2 | 20.885 | 0.01 | Norland NOA61 | 1.5600 | 43.00 | Adhesive |
| 3 | 20.875 | 1.419 | P-SK50 Sumita | 1.5938 | 61.38 | |
| 4 | 7.075 | 3.000 | Air | | | |
| 5 | 3.384 | 1.007 | C500 Hoya | 1.5145 | 66.22 | IR cut filter |
| 6 | 2.377 | 0.077 | Air | | | |
| 7 | 2.300 | 1.100 | S-LAH58 Ohara | 1.8229 | 40.76 | |
| 8 | 1.200 | 0.005 | Air | | | Virtual stop |
| 9 | 1.195 | 2.390 | N-LAK8 Schott | 1.7130 | 53.83 | |
| 10 | −1.195 | 0.01 | Norland NOA61 | 1.5600 | 43.00 | Adhesive |
| 11 | −1.205 | 1.348 | S-LAH79 Ohara | 2.0033 | 28.27 | |
| 12 | −2.553 | 0.249 | Air | | | |
| 13 | −2.802 | 1.009 | K7 Schott | 1.5111 | 60.40 | |
| 14 | −3.811 | 1.260 | Air | | | |
| 15 | −4.898 | 1.000 | GG435 Schott | | | UV cut filter |
| 16 | −5.898 | 0.010 | Norland NOA61 | | | Adhesive |
| IMA | −5.908 | | | | | |

In Table 3, the first surface "1" is aspherical and has conic coefficient −2.0115, 4th order term 2.8555E-5, 6th order term −8.831E-12 and 8th order term 3.9646E-11. The negative field expander attachment 1702 makes a transformation of input to output field angles. The field angle transformation by the negative front attachment for the imaging beams are shown in the Table 4.

TABLE 4

Field expander attachment input/output angles transformations.

| | Axis | Field 1 | Field 2 | Field 3 |
|---|---|---|---|---|
| Input field angle (degrees) | 0 | 40 | 80 | 95 |
| Output principal ray angle (degrees) | 0 | 38.2 | 70 | 79.8 |

By compressing the input field angles, the negative field expander attachment 1702 enables imaging within the fields range exceeding 180°, as noted above. Such a wide angle range would not be possible with a purely MC lens arrangement. The lens system 1700 may provide substantially vignette-free imaging within +/−60° input fields span, and may provide usable images over the +/−95° image span.

In the example of FIG. 17, the lens 1700 may be implemented with a 6 mm focal length, and a virtual stop radius of 1.2 mm, which may provide F/2.5 operation F-number for the MC lens 1703 with objects at infinity distance, although other values may be used for focal length and the like. Negative field expander attachment 1702 moves an object at infinity to a 35 mm apparent distance. Per Equation (26) (see, Appendix A below), the field expander attachment 1702 for this objective is F/2.71. Because the negative front attachment MC spherical core operates from the finite distance, the mounting meniscus 1703 may be non-concentric with the core, but is shifted towards or away from the core in the same or similar way as with focusing in an entirely MC lens (see, e.g. Monocentric Lens Designs And Associated Imaging Systems Having Wide Field Of View And High Resolution. US Patent Publication No. 20150207990, which is incorporated herein in its entirety).

Figure 18:
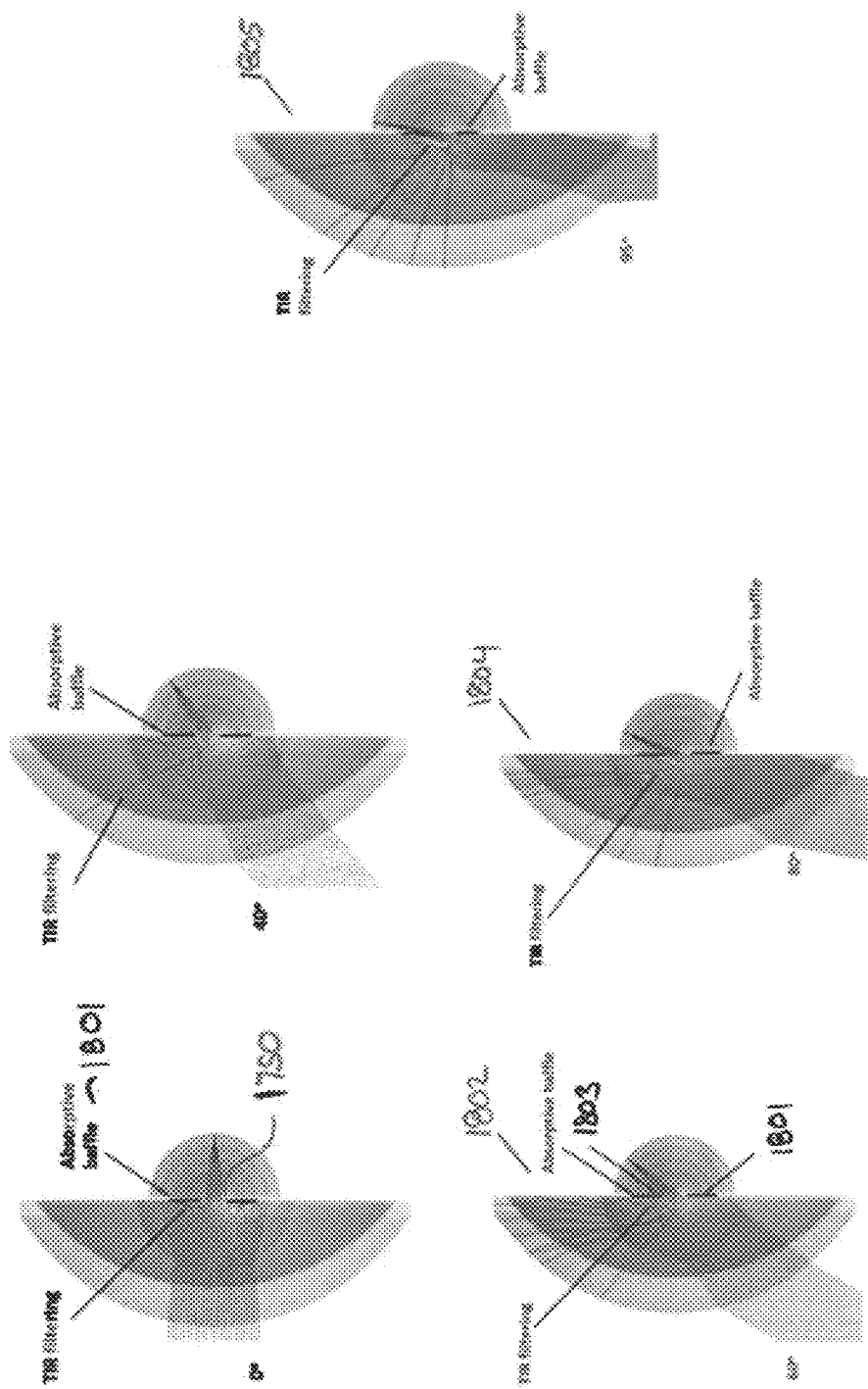
FIG. 18 depicts ray tracing simulations for the lens of FIG. 17.

Raytracing simulations of the TIR virtual stop of lens 1700 at different input field angles are shown at FIG. 18. The MC core 1701 of the lens may include an absorptive baffle 1801 up to the central, spherical core lens 1750 (labeled N-LAK8, which refers to the name of the material, available from Schott glass). Within +/−60° fields, the baffle may not cut beams. Beamforming within the field angles may be provided by TIR filtering. At the 60° field point 1802, the marginal ray 1803 is touching the lower edge of the baffle. For larger angles the baffle begins to vignette the beams. Because the wider field angles are compressed by the front negative attachment, at the 80° input field 1804, the tangential aperture width is still 70% of the maximum on-axis aperture and at a 95° field 1805, the tangential aperture is still 34% of the axial aperture value, yielding a useable level of light energy and optical resolution at these extremely wide input angles.

Figure 19:
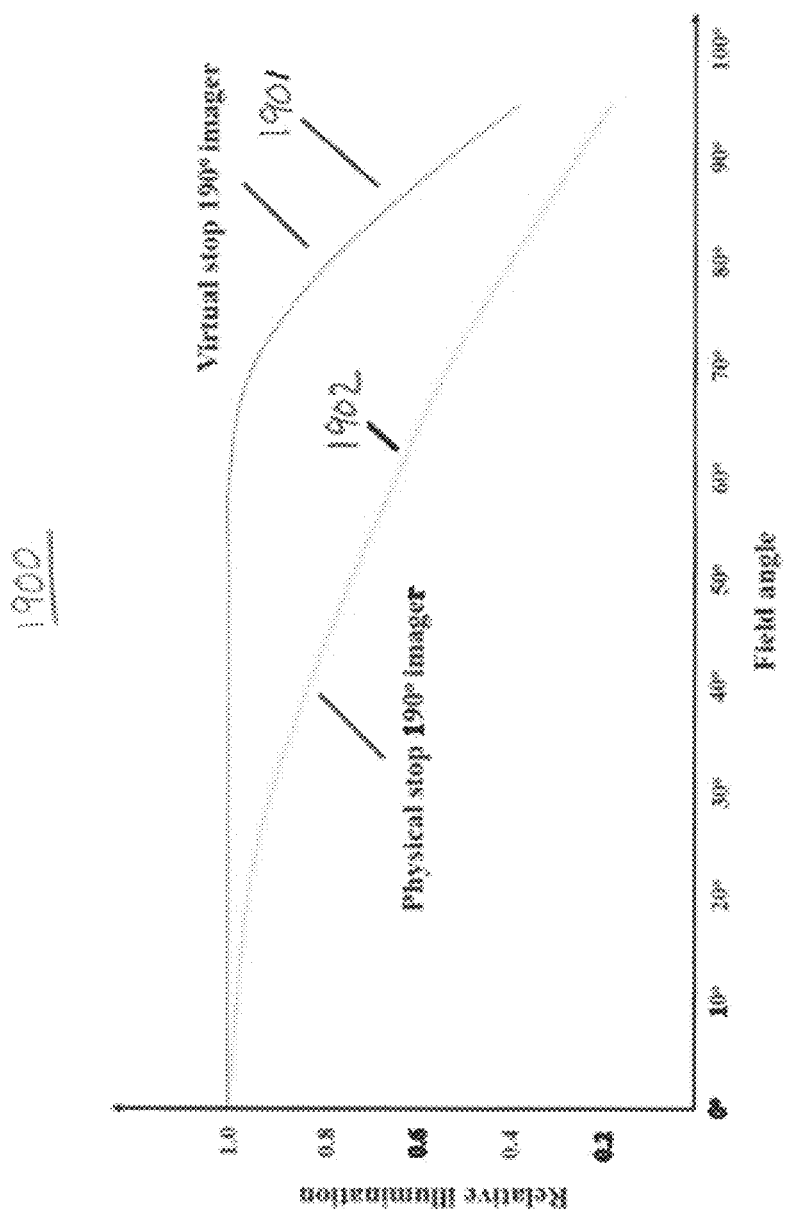
FIG. 19 plots the relative illumination for the lens of FIG. 17.
Figure 20:
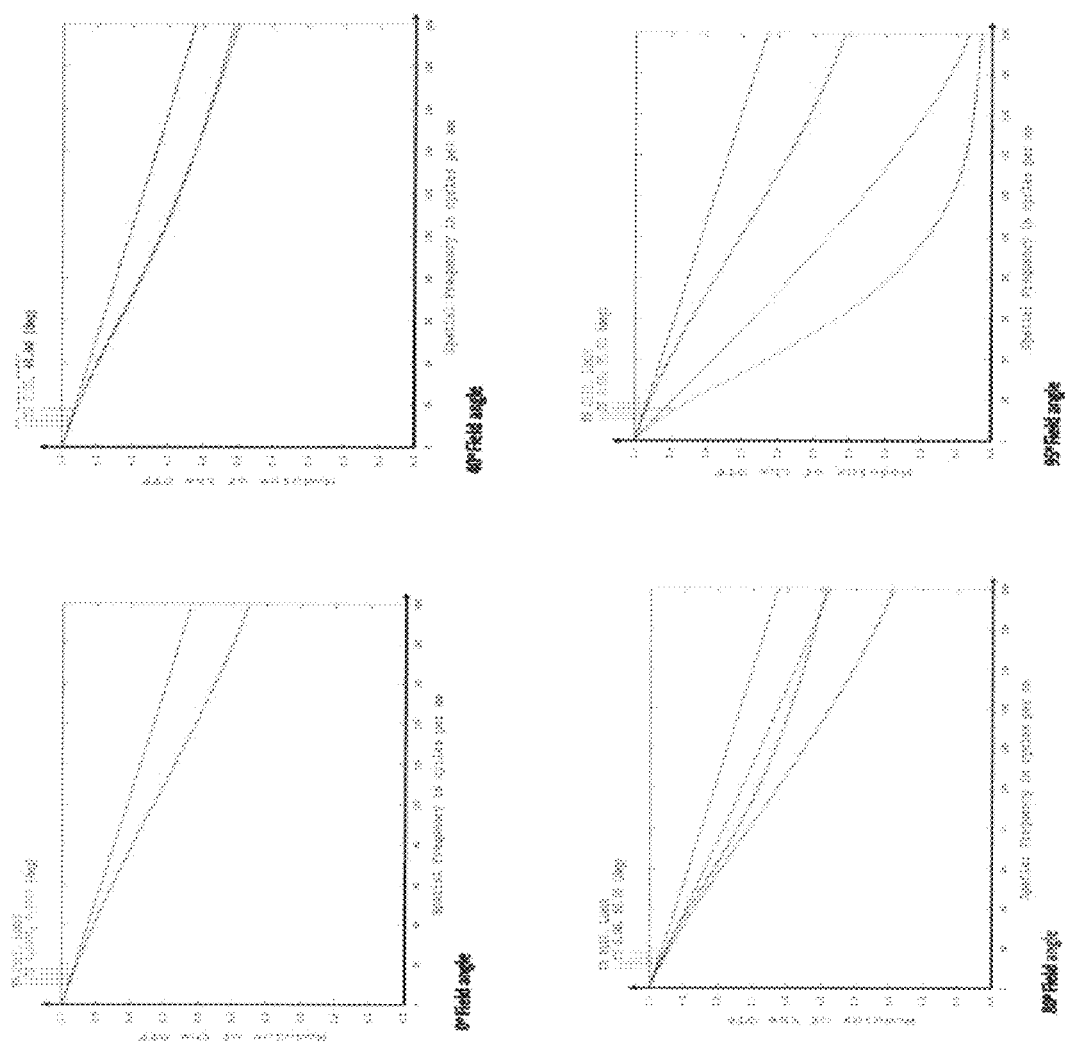
FIG. 20 plots modulation transfer function versus spatial frequency for different field angles for the lens of FIG. 17.

FIG. 19 plots the relative illumination of the lens 1700 (plot 1901) versus field angle and also plots, for comparison, a lens (plot 1902) not using a TIR virtual aperture stop. FIG. 20 plots the modulation transfer function (image contrast) versus spatial frequency (the inverse of feature size) for different field angles for the lens 1700.

Figure 21B:
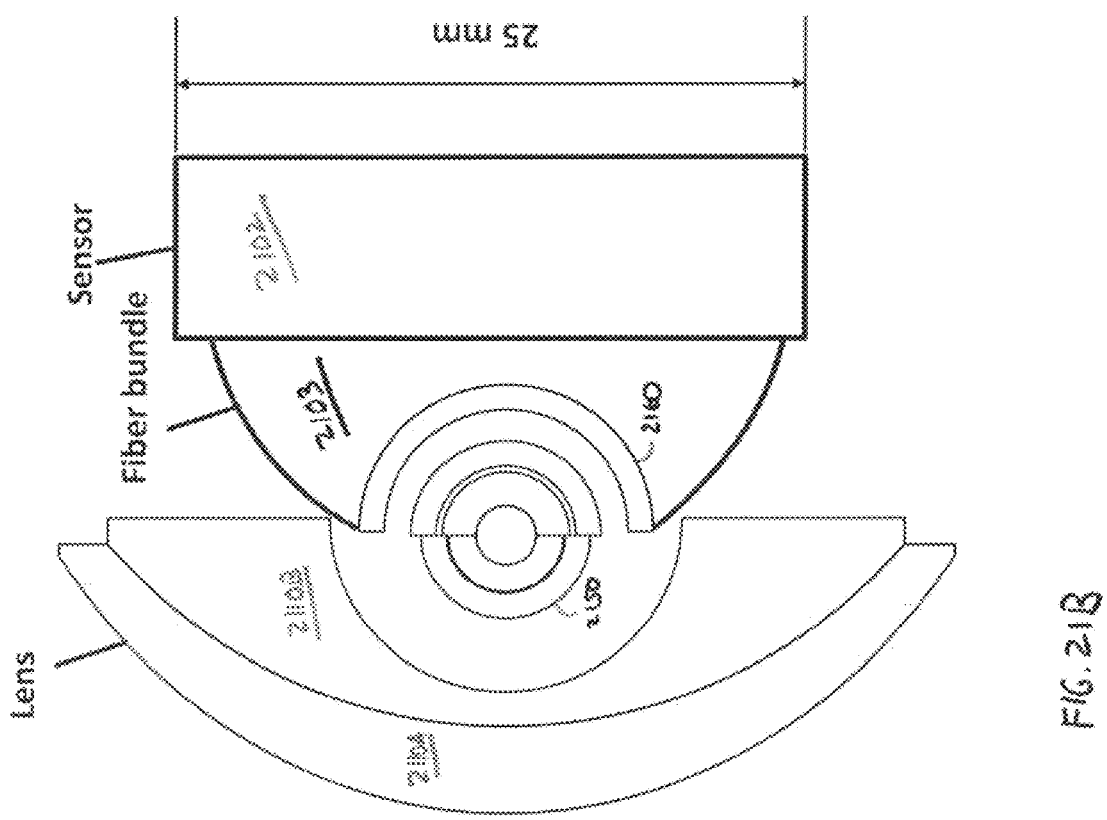
FIG. 21B shows the lens of FIG. 21A without the ray tracing.

FIG. 21A shows a lens 2100 assembly including a front portion 2101 comprising a field expander 2110A-B followed by the MC lens assembly 2150. Lens 2100 is similar to lens 1700 but further includes a fiber taper 2103 carrying the spherical image data to a sensor such as a one-inch format CMOS sensor 2102. In this example implementation, the image is delivered from the curved image surface 2160 to the flat sensor 2102 with the fiber taper 2103. See, e.g., S. Karbasi et al., "Curved fiber bundles for monocentric lens imaging," paper 9579-13, SPIE Optical Engineering+Applications, San Diego Calif., August 2015. Although a fiber taper is shown, the image may be transferred to the sensor in other ways as well including for example a letterbox type image delivery system (see, e.g., I. Stamenov et al., "Panoramic monocentric imaging using fiber-coupled focal planes", Optics Express 22(26), pp. 31708-31721, 2014) with several bundle/taper/sensor assemblies attached to the mounting meniscus. FIG. 21B shows a lens 2100 of FIG. 21A without the ray tracing.

Figure 22:
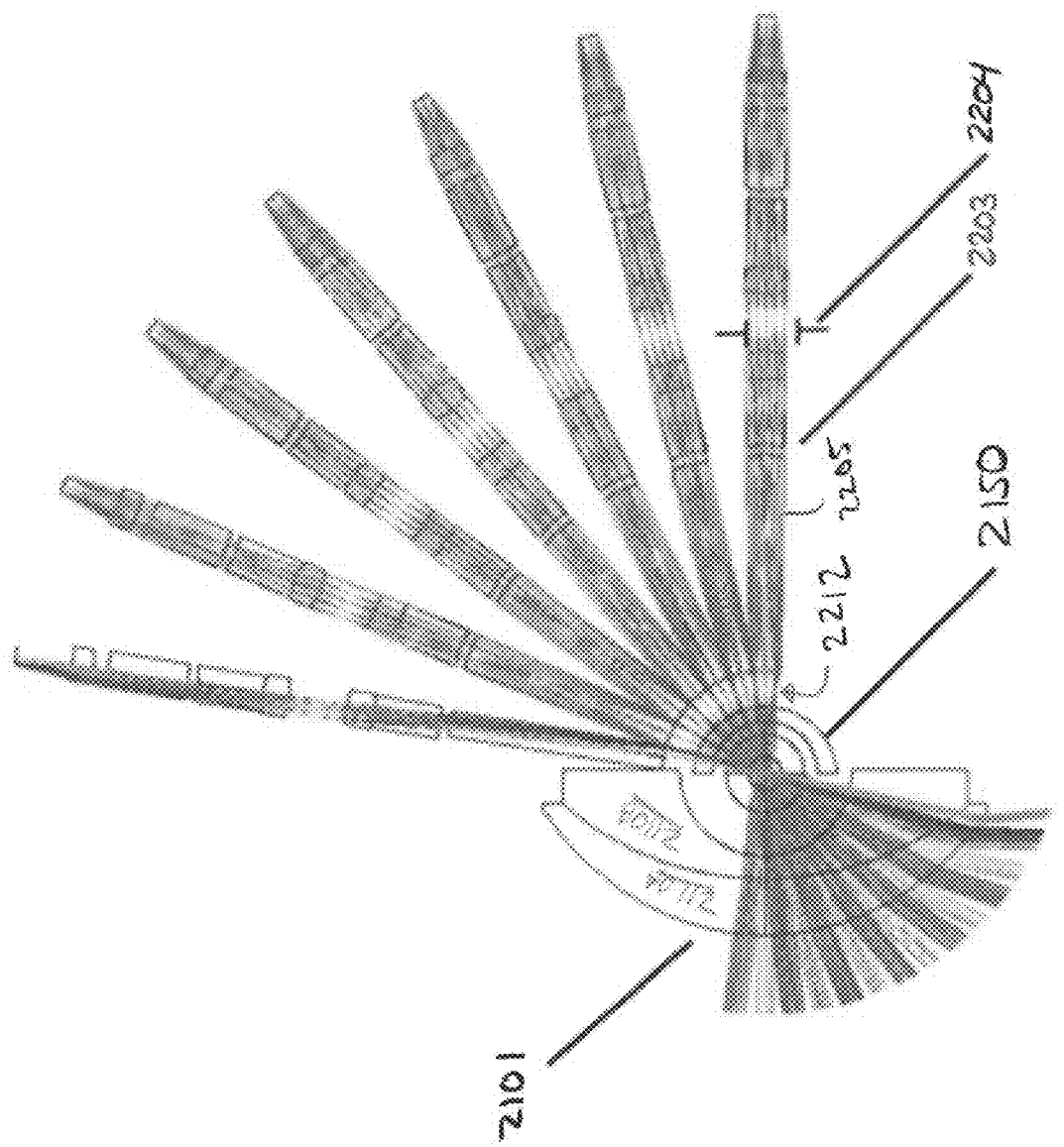
FIG. 22 depicts the lens assembly of FIG. 23 further including an optical relay system to couple the image to one or more planar image sensors.

FIG. 22 depicts a lens assembly 2200 including field expander lenses 2101, an MC lens 2150, relay objectives 2203, and physical aperture stops 2204. The lens assembly 2200 may provide an extremely wide field of view, such as about 190° (although other field of view values may be realized as well) due to the fish-eye type field expander 2101 in the front of the MC lens 2150. Unlike FIG. 21A-B, the lens assembly 2200 uses relay image objectives to carry or project the image from the image surface 2212 to a sensor, such as a CMOS sensor.

The field expander 2101 provides compression of the input light fields. The field expander, in combination with the MC lens 2150 assembly including the TIR layer (which provides the virtual aperture stop in accordance with some example embodiments), creates a high-quality image at the intermediate image surface 2212. The relay objectives 2203 pickup segments of the image at the image surface 2212, and then deliver the image to a sensor such as a CMOS sensor. Each relay objective may have a physical aperture stop 2204 conjugated with the center of MC lens core 2402. When this is the case, the MC core operates with the specific virtual aperture stop rotated for each position of the relay objective. The virtual stop arrangements may provide advanced field illumination and resolution over extremely wide 190° field of view. An example implementation of the relay can be found at U.S. Pat. No. 8,928,988, Monocentric Imaging, by J. E. Ford and E. J. Tremblay, which is incorporated herein by reference in its entirety.

Figure 23:
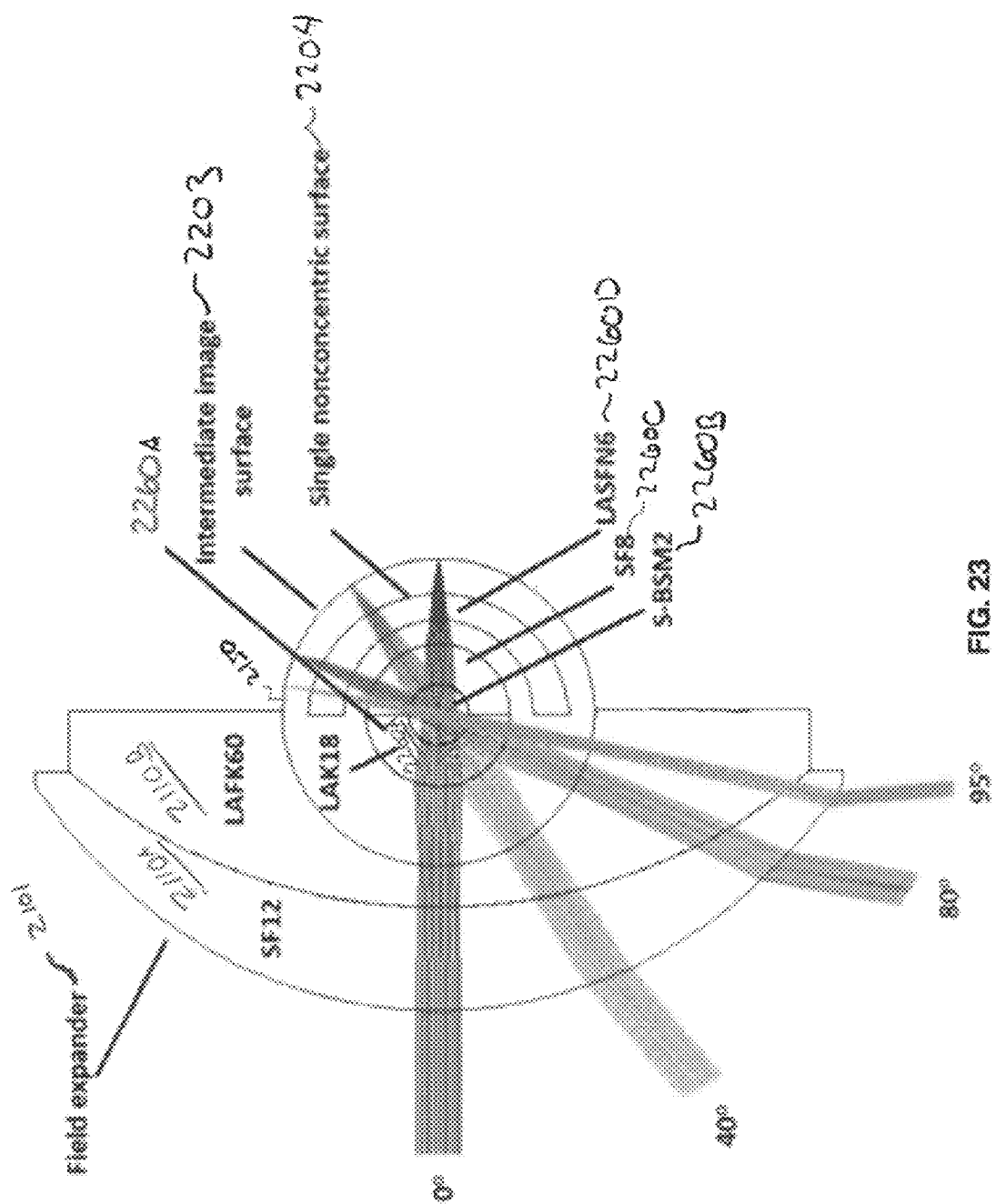
FIG. 23 depicts another example of a lens assembly including a non-monocentric negative lens group lens followed by monocentric lens elements including a total internal reflectance layer.

FIG. 23 depicts another example implementation of the MC lens assembly 2150 and field expander 2101. The field expander 2101 may include lens 2110A and lens 2110B, and the MC lens assembly may include lenses 2260A-D. The MC lens assembly may create an intermediate image at the spherical surface 2203 having its center at the center of the MC lens. One or more relay systems may have physical aperture stops conjugated with the center of the MC core, as noted. The relay systems may be mounted concentrically around the center of the MC lens, so the back way images of their physical stops will be located at the MC core center and rotated together with relays forming the rotated virtual stop. The relays may be implemented to be similar if not identical to the relays described with respect to FIG. 22.

The field expander/MC lens assembly of FIG. 23 may provide uniformity of the image quality over the whole intermediate image surface. The intermediate image may be of high resolution, or the intermediate image at 2203 can be of moderate image quality and have significant image aberrations (as a function of the field expander/MC lens), which are corrected by the image relay systems. This example assembly of FIG. 23 may provide near diffraction-limited image quality on the intermediate spherical image surface 2203. Moreover, cascaded systems of this type with stable high quality at intermediate stages 2203 may be less sensitive to misalignment. The field expander 2101 may have a negative power, and may not be free from field astigmatism, which cannot be compensated with the perfect concentric architecture of the MC lens assembly. Because the intermediate image spherical surface is concentric with the center where virtual stops are located, the last meniscus surface 2204 may be chosen to be non-concentric as is shown in the FIG. 23. Optical prescription of the field expander/MC lens assembly of FIG. 23 is shown at the Table 5.

TABLE 5

Optical prescription of exemplary 190° multiscale field expander/MC core assembly of FIG. 23.

| Surface | Radius | Thickness | Material | $N_d$ | $V_d$ | Comments |
|---|---|---|---|---|---|---|
| OBJ | infinity | infinity | | | | |
| 1 | 16.993 | 3.892 | SF12 Sumita | 1.6483 | 33.76 | Aspherical |
| 2 | 21.551 | 0.01 | Norland NOA61 | 1.5600 | 43.00 | |
| 3 | 21.541 | 1.563 | LAFK60 Sumita | 1.6324 | 63.78 | |
| 4 | 5.914 | 3.000 | air | | | |
| 5 | 2.723 | 1.571 | LAK18 Sumita | 1.7291 | 54.67 | |
| 6 | 1.152 | 0.01 | Norland NOA61 | 1.5600 | 43.00 | |
| 7 | 1.142 | 2.284 | S-BSM2 Ohara | 1.6073 | 58.81 | |
| 8 | −1.142 | 0.01 | Norland NOA61 | 1.5600 | 43.00 | |
| 9 | −1.152 | 1.523 | SF8 Sumita | 1.6889 | 31.14 | |
| 10 | −2.675 | 0.913 | air | | | |
| 11 | −3.588 | 1.000 | LASFN6 Sumita | 1.8023 | 46.72 | |
| 12 | −4.954 | 1.311 | air | | | |
| IMA | −5.899 | | | | | |

At Table 5, the first surface "1" is aspherical and has conic coefficient −0.2516, 4th order term −1.768E-6, 6th order term 2.772E-08 and 8th order term −5.207E-11.

The negative field expander 2101 makes a transformation of input to output field angles, reducing the principal ray angle and therefore expanding the field of view of the original MC lens. The effect on the field angle (principal ray angle transformation) for the exemplary imaging directions is shown at the Table 6.

TABLE 6

Field expander attachment input/output field angles transformations.

|  | Axis | Field 1 | Field 2 | Field 3 |
|---|---|---|---|---|
| Input principal ray angle (entering field expander) | 0° | 40° | 80° | 95° |
| Output principal ray angle (exiting field expander) | 0° | 33.5° | 70° | 79.8° |

An optical prescription of the relay system 2203 is shown in the Table 7.

TABLE 7

Optical prescription of the relay system

| Surface | Radius | Thickness | Material | $N_d$ | $V_d$ | Comments |
|---|---|---|---|---|---|---|
| OBJ | −5.899 | 1.150 |  |  |  |  |
| 1 | 4.426 | 15.00 | LASFN17 Sumita | 1.8229 | 40.94 |  |
| 2 | −7.763 | 0.750 | air |  |  |  |
| 3 | −3.999 | 4.500 | KF5 Sumita | 1.5231 | 50.92 |  |
| 4 | 12.498 | 1.939 | S-LAH59 Ohara | 1.8160 | 46.62 |  |
| 5 | −17.146 | 2.000 | air |  |  |  |
| 6 | Infinity | 2.000 | air |  |  | Aperture Stop |
| 7 | 5.702 | 1.939 | LAFK60 Sumita | 1.6324 | 63.78 |  |
| 8 | −3.508 | 4.500 | SF5 Schott | 1.6727 | 32.21 |  |
| 9 | 3.999 | 0.750 | Air |  |  |  |
| 10 | 12.907 | 5.589 | LASF35 Schott | 2.0222 | 29.06 |  |
| 11 | −12.720 | 1.000 | air |  |  |  |
| 12 | 9.999 | 1.500 | L-BBH2 Ohara | 2.1029 | 18.05 |  |
| 13 | 14.723 | 4.000 | air |  |  |  |
| IMA | Infinity |  |  |  |  |  |

The relay systems are mounted around spherical intermediate image surface in a way that axis' of the relay systems cross the MC lens center with the same 1.15 mm air gap to this intermediate image surface for each, and input subfields covers the overall input field without gaps. Because the spherical intermediate image surface is concentric to the MC core center, such an arrangement of relay systems over the field is achieved with the rotation of the centered relay system around the MC core center. The angle of rotation and input fields received by each relay system mounted in the tangential plane (which is shown in the FIG. 22) are listed in the Table 8.

TABLE 8

Field coverage by relay systems.

|  | Axis #1 | Relay #2 | Relay #3 | Relay #4 |
|---|---|---|---|---|
| Angle of rotation (degrees) | 0 | −13.6 | −27 | −40.5 |
| Input field #1 Y (degrees) | 0 | 16.0 | 32.0 | 48.0 |
| Input field #2 Y (degrees) | 8.0 | 24.0 | 40.0 | 56.0 |
| Input field #3 Y (degrees) | −8.0 | 8.0 | 24.0 | 40.0 |
| Input field #4 Y (degrees) | 0 | 16 | 32.0 | 48.0 |
| Input field #1 X (degrees) | 0 | 0 | 0 | 0 |
| Input field #2 X (degrees) | 0 | 0 | 0 | 0 |
| Input field #3 X (degrees) |  |  |  |  |
| Input field #4 X (degrees) | 8.0 | 8.0 | 8.0 | 8.0 |

|  | Relay #5 | Relay #6 | Relay #7 |
|---|---|---|---|
| Angle of rotation (degrees) | −54 | −67.5 | −81 |
| Input field #1 Y (degrees) | 64.0 | 80.0 | 90.0 |
| Input field #2 Y (degrees) | 72.2 | 88.6 | 95.0 |
| Input field #3 Y (degrees) | 56.0 | 72.2 | 88.6 |
| Input field #4 Y (degrees) | 64.0 | 80.0 | 90.0 |
| Input field #1 X (degrees) | 0 | 0 | 0 |
| Input field #2 X (degrees) | 0 | 0 | 0 |
| Input field #3 X (degrees) | 0 | 0 | 0 |
| Input field #4 X (degrees) | 8.0 | 8.0 | 8.0 |

In Table 8, input field points #1 are centers of the local relay fields with the image point position at the center of CMOS. Field points #2 are the upper points of the local fields. Input points #3 are the lower points of the local fields. As shown in Table 8, the angles of upper points of the relay with number i are the same as angles of lower points of relays with number i+1. In FIG. 22 and Table 8, only half of the relay systems (which are located in the tangential plane) are shown. The lower set of the relay system array in the tangential plane is symmetrical. The shape of the local fields may be hexagonal. The 3D imaging relay system array may be constructed by attaching hexagonal local fields to the tangential array in the 3D space. The first component of the relay system 2205 may have a hexagonal shape in the orthogonal to the local axis section. The front clear apertures of relay systems are touching each other, constructing a continuous 3D regular polyhedron surface. The front component may be long enough to provide space for an opto-mechanical mount at the backside of components while the front sides are closely in touch with each other. Imaging beams at the edges of local fields are slightly vignetted and the maximum vignetting which occurs at the edge field points may be 50%. Because image quality at the intermediate image surface is close to the diffraction limit and the relay systems are identical and arranged with rotation around this intermediate image surface center (center of MC core), the image quality at all relay branches may be similar and high.

The monocentric lenses shown in FIG. 1 and FIG. 5 form a spherical image, which may be sensed using an image sensor that provides a spherically shaped input face. Conventional focal planes made using lithography on crystalline semiconductor materials typically have a substantially flat input surface. An image sensor with a spherical optical input surface may be formed by use of an optical fiber bundle to couple the spherical input image at the front of the optical fiber bundle to a conventional flat focal plane at the planar output face of the optical fiber bundles. It is difficult to form a focal plane made of crystalline semiconductor material into a deep spherical shape, but is possible to form a thin crystalline semiconductor into a deep cylindrical shape which closely matches the spherical image surface in a first (e.g. horizontal) dimension. The description below describes embodiments related to the use of a cylindrical sensor and a field flattener to enable use of the cylindrical sensor.

In some example embodiments, one or more optical elements with substantially toroidal shapes may provide image field flattening in a first dimension (e.g., vertical) to couple the spherical input image (provided by the MC lens assembly, for example) to a cylindrical image sensor. The combination of the toroidal field flattening optics with the cylindrical image sensor may provide an image sensor that provides an in-focus sensing of a spherical image, provided the spherical image is of limited angular range in a given dimension (e.g. vertical).

The MC lens assemblies including the TIR layer providing the virtual aperture stop may be coupled to one or more cylindrically shaped sensors, such as a cylindrically shaped CMOS image sensors. FIGS. 24-26C relate to these cylindrical sensor implementations.

Figure 24:
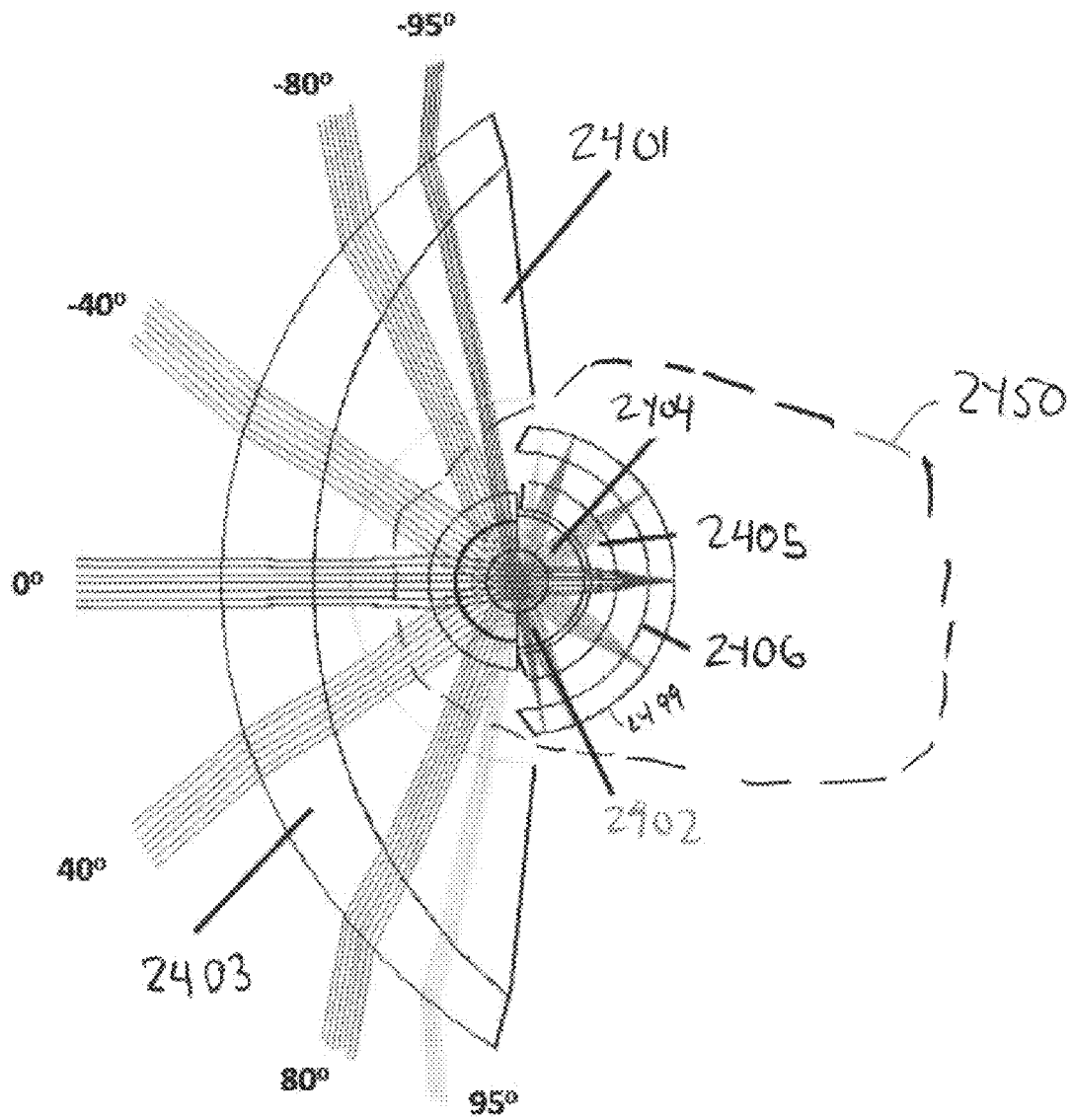
FIG. 24 depicts a top-down view of a lens having a wide horizontal field of view and imaging onto a cylindrically shaped image sensor.

FIG. 24 depicts a lens assembly 2400 including an MC lens assembly 2450 having a TIR layer and lenses 2401/2403 placed before the MC lens assembly 2450, in accordance with some example embodiments. The MC lens assembly 2450 may use a TIR layer comprising an air gap, although the TIR layer may be implemented in other ways as well (e.g., using a solid medium such as the optical adhesive noted above). As noted, the TIR layer may provide the virtual aperture stop, in accordance with some example embodiments. Although some of the examples described herein refer to the field flattening optics being used with the monocentric lens including the virtual stop aperture, the field flattening optics may be used with other lenses including monocentric lens without the virtual stop aperture (i.e., with a physical aperture as in FIG. 1103).

In some example embodiments, the lens 2400 may have wide horizontal field of view, such as 190 degrees, although other field of views may be realized as well. In the elevation plane (which is depicted at FIG. 25), the lens 2400 may have a 40 degree vertical field of view (elevation). To enable this configuration, one or more toroidal field flatteners 2405/2406 may be used to translate the image provided by the MC lens into an image that can be detected by the cylindrical sensor having for example a wide horizontal field of view (e.g., 190 degrees) and a more limited vertical field of view (e.g., 40 degree vertical).

At FIG. 24, the toroidal field flatteners 2405/2406 are comprised of the last two lens elements 2405 and 2406. Both of the elements 2405/2406 can be described as toroidal surfaces, so the toroidal elements 2405/2406. FIG. 24 is thus a top-down (cross sectional) view of a lens that contains two toroidal elements 2405/2406.

FIG. 26A depicts the toroidal elements 2405/2406, which have an arbitrary profile in one direction (such as the vertical direction as shown in FIG. 25), but the elements 2405/2406 are circular in the orthogonal (or horizontal as shown in FIG. 24) direction. The toroidal elements 2405/2406 may provide field flattening, such that in one plane the image maintains its spherical nature (as shown in FIG. 24), but in another plane the toroidal field flatteners 2405/2406 flatten then image enabling a sensor 2499, such as a curved, cylindrical sensor 2499 to detect the image. The sensor 2499 may be coupled, or applied, directly on the second toroid 2405. FIG. 26A depicts the toroidal field flatteners 2405/2406 with a an image sensor such as a CMOS sensor 2499 having a cylindrical (or curved) image detection plane in the horizontal axis and a linear (or straight) image detection plane in the vertical axis. The toroidal field flatteners 2405/2406 are configured to flatten or translate, in the vertical axis, the image for the sensor 2499 linear (or straight) image detection plane in the vertical axis.

Figure 26C:
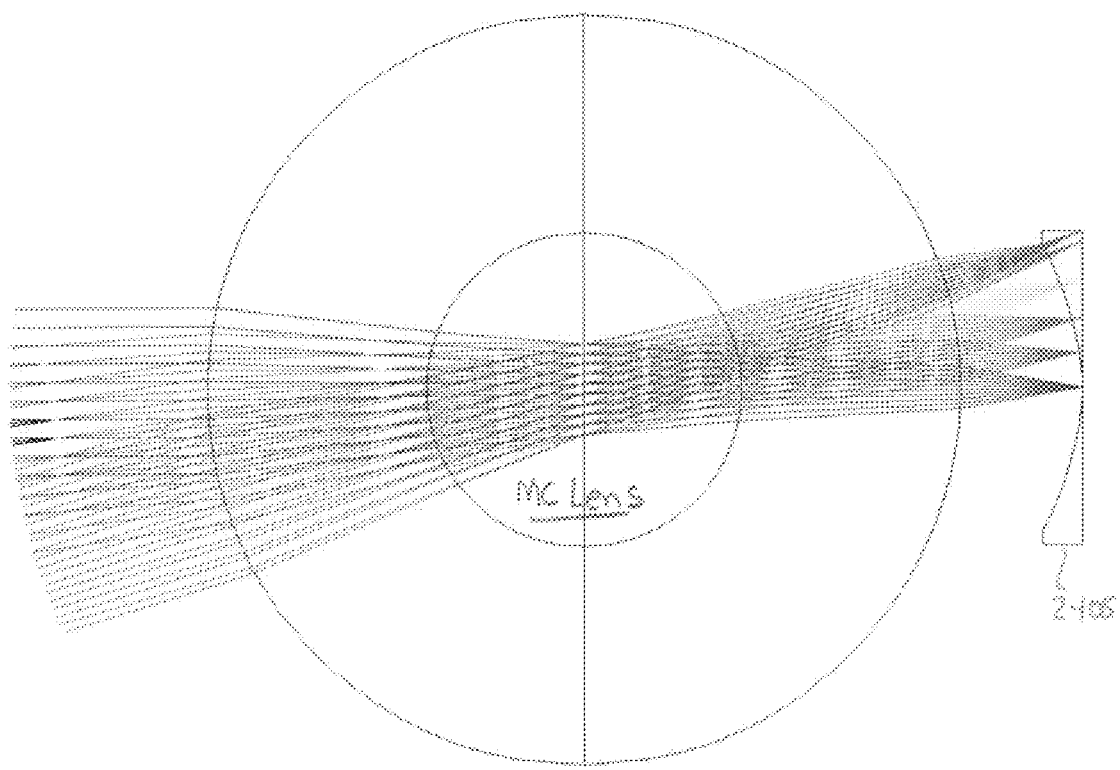
FIG. 26C shows a ray tracing of the toroidal field flattener.

FIG. 26B shows a perspective view of another toroidal field flattener 2406 (having for example a curved input face and cylindrical output face coupled to the sensor) In particular, FIG. 26B shows at 2499 the face of the image sensor is thin and/or cylindrical to enable positioning near the rear surface of the toroidal field flatterer or to enable attachment to the rear surface of the toroidal field flatterer. FIG. 26C depicts ray tracing showing the flattening performed by toroidal field flattener 2406.

The toroidal field flattener 2405, as shown in the horizontal view of FIG. 24, has two surfaces with on-axis circular radiuses −2.802 mm and −3.621 mm respectively. Mounting meniscus 2406 has two surfaces with on-axis circular radiuses −4.891 and 5.891 mm. The cylindrical CMOS may be coupled to the mounting meniscus 2406 with an optical adhesive. The air gap with meniscus 2405 is 1.320 mm. The optical prescription of the lens assembly 2400 may be the same or similar to the prescription at Table 3. The meniscus 2405 may be made of an optical glass having an index of refraction of 1.6031 (e.g., N-SK14). The mounting meniscus 2406 may be made of an optical glass having an index of refraction of 1.532 (e.g., GG435).

FIG. 25 depicts a side, or cross sectional, view of the lens assembly 2400 including toroidal field flatteners 2405/2406 and sensor 2499. The field of view lens assembly 2400 in elevation is +/−20 degrees. The vertical (tangential) sections of the 2503 are polynomial curves; normalization radius is 5 mm. The coefficients of the front surface of meniscus 2503 are: Cy2=−1.954, Cy4=−21.2133, Cy6=387.1727. Coefficients of the back surface are: Cy2=−3.6969, Cy4=−13.9247 Cy6=363.190. The front surface of the mounting meniscus 2506 has coefficients: Cy2=−11.2034, Cy4=85.2855, Cy6=−11.1644. Outer surface of lens element 2406 is cylindrical with sagittal radius −5.891 mm.

In the sagittal plane, the lens assembly 2400 has resolution 200 lp/mm with contrast better than 0.3. In the elevation (tangential plane), resolution is low at the edges. At the edges of the field in elevation, the imager provides 120 lp/mm resolution with 0.3 contrast.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   a lens comprising a first medium, a second medium, and a third medium, the first medium having a first index of refraction and the second medium having a second index of refraction,
   wherein the first index of refraction is greater than the second index of refraction,
   wherein an interface between the first medium and the second medium is convex, and
   wherein the second medium is interposed between the first medium and the third medium to form an aperture providing, based at least on an angle of light incidence, a total internal reflection of at least some incident light passing from the first medium to the third medium.

2. The apparatus of claim 1, wherein the convex interface between the first medium and the second medium is spherical.

3. The apparatus of claim 1, wherein a plurality of surfaces within the lens are spherical and share a common center of curvature.

4. The apparatus of claim 1, wherein the third medium is associated with a third index of refraction that is greater than the second index of refraction.

5. The apparatus of claim 1, wherein a thickness of the second medium is less than the focal length of the apparatus.

6. A system comprising:
a plurality of lens layers each having a substantially spherical shape and each sharing a substantially common center of curvature, wherein the plurality of lens layers include a first layer, a second layer, and a third layer, wherein the first layer is associated with a first index of refraction and the second layer is associated with a second index of refraction, wherein the first index of refraction is greater than the second index of refraction, wherein an interface between the first layer and the second layer comprises a first convex internal surface, and wherein the second layer is interposed between the first layer and the third layer to form an aperture providing, based at least on an angle of light incidence, a total internal reflection of at least some incident light passing from the first layer to the third layer.

7. The system of claim 6, wherein the third layer is associated with a third index of refraction that is higher than the second index of refraction, wherein an interface between the second layer and the third layer comprises a second convex internal surface, and wherein a separation between the first convex internal surface and the second convex internal surface is minimized to limit an angular deviation of light rays passing from the second layer to the third layer.

\* \* \* \* \*